United States Patent
Burroughs et al.

(10) Patent No.: US 9,140,801 B2
(45) Date of Patent: Sep. 22, 2015

(54) DELAYED RADIO RESOURCE SIGNALING IN A MOBILE RADIO NETWORK

(71) Applicant: QUALCOMM Incorporated, San Diego, CA (US)

(72) Inventors: Kirk Allan Burroughs, Alamo, CA (US); Thomas K. Rowland, Los Gatos, CA (US); James Douglass DeLoach, Jr., Los Altos, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/464,192

(22) Filed: Aug. 20, 2014

(65) Prior Publication Data

US 2014/0357301 A1 Dec. 4, 2014

Related U.S. Application Data

(63) Continuation of application No. 12/208,288, filed on Sep. 10, 2008, now Pat. No. 8,948,778.

(60) Provisional application No. 60/971,453, filed on Sep. 11, 2007, provisional application No. 61/012,039, filed on Dec. 6, 2007.

(51) Int. Cl.
*H04W 24/00* (2009.01)
*G01S 19/34* (2010.01)
(Continued)

(52) U.S. Cl.
CPC ............ *G01S 19/34* (2013.01); *G01S 19/03* (2013.01); *G01S 19/258* (2013.01); *H04W 4/02* (2013.01); *H04W 24/10* (2013.01); *G01S 5/0027* (2013.01); *H04W 64/006* (2013.01)

(58) Field of Classification Search
CPC ...... H04W 4/02; H04W 64/00; H04W 64/006; H04W 24/10; G01S 19/05; G01S 19/258; G01S 19/25; G01S 19/34; G01S 5/0027; G01S 19/03; H04L 67/18
See application file for complete search history.

(56) References Cited

U.S. PATENT DOCUMENTS 6,362,778 B2 3/2002 Neher
6,408,178 B1 6/2002 Wickstrom et al.
(Continued)

FOREIGN PATENT DOCUMENTS

EP 1619914 A1 1/2006
JP H0575688 A 3/1993
(Continued)

OTHER PUBLICATIONS

3GPP. "Digital cellular telecommunications system (Phase 2+); Location Services (LCS); Mobile Station (MS)—Serving Mobile Location Centre (SMLC); Radio Resource LCS Protocol (RRLP); (3GPP TS 44.031 version 7.5.0 Release 7); ETSI 144 031," ETSI Standards, Sophia Antipolis Cedex, France, V7.5.0, Jun. 1, 2007, XP014038545, *Section 2.2: "Position Measurement Procedure," figure 2.1, * Section A.2.2.1: "Positioning Instructions Element" (response time, accuracy).*.

(Continued)

*Primary Examiner* — Ajit Patel
(74) *Attorney, Agent, or Firm* — Thien T. Nguyen

(57) ABSTRACT

An implementation of a system, device and method for communicating location data of a mobile station, enhancing location data, optimally communicating Assistance Data, and/or reducing rebids of Measure Position Request messages in a wireless network.

17 Claims, 18 Drawing Sheets

(51) Int. Cl.
*G01S 19/03* (2010.01)
*G01S 19/25* (2010.01)
*H04W 4/02* (2009.01)
*H04W 24/10* (2009.01)
*G01S 5/00* (2006.01)
*H04W 64/00* (2009.01)

(56) References Cited

U.S. PATENT DOCUMENTS

| | | | |
|---|---|---|---|
| 6,429,808 B1 | 8/2002 | King et al. | |
| 6,559,794 B1 | 5/2003 | Nakajima et al. | |
| 6,560,461 B1 | 5/2003 | Fomukong et al. | |
| 6,584,314 B1 | 6/2003 | Haumont et al. | |
| 6,686,877 B2 | 2/2004 | Ishigaki et al. | |
| 6,720,915 B2 | 4/2004 | Sheynblat | |
| 7,138,943 B2 | 11/2006 | Sheynblat | |
| 7,317,910 B2 | 1/2008 | Niemenmaa et al. | |
| 7,570,960 B2 | 8/2009 | Fujii | |
| 7,848,769 B2 | 12/2010 | Fuller, Jr. et al. | |
| 7,894,578 B2 | 2/2011 | McClelland | |
| 8,126,423 B2 | 2/2012 | Dunn et al. | |
| 8,195,188 B2 | 6/2012 | Fomukong et al. | |
| 8,797,209 B2 | 8/2014 | Burroughs et al. | |
| 2001/0017599 A1 | 8/2001 | Yule et al. | |
| 2002/0027993 A1* | 3/2002 | Vanttinen | 380/258 |
| 2002/0061756 A1 | 5/2002 | Bleckert et al. | |
| 2002/0072378 A1 | 6/2002 | Gaal | |
| 2002/0110096 A1 | 8/2002 | Carlsson et al. | |
| 2002/0145557 A1 | 10/2002 | Roy et al. | |
| 2002/0169539 A1 | 11/2002 | Menard et al. | |
| 2003/0139183 A1 | 7/2003 | Rantalainen | |
| 2004/0018829 A1 | 1/2004 | Raman et al. | |
| 2004/0092252 A1 | 5/2004 | Gustavsson et al. | |
| 2004/0160909 A1 | 8/2004 | Sheynblat | |
| 2004/0185870 A1 | 9/2004 | Matsuda | |
| 2004/0203879 A1 | 10/2004 | Gardner et al. | |
| 2005/0007980 A1 | 1/2005 | Landais et al. | |
| 2005/0055160 A1* | 3/2005 | King | 701/213 |
| 2005/0116858 A1 | 6/2005 | Odamura | |
| 2005/0130673 A1 | 6/2005 | Annamalai | |
| 2005/0136938 A1 | 6/2005 | Kang | |
| 2005/0136942 A1 | 6/2005 | Timiri et al. | |
| 2005/0186968 A1 | 8/2005 | Durst et al. | |
| 2006/0135176 A1* | 6/2006 | Xiong | 455/456.1 |
| 2006/0178154 A1 | 8/2006 | Farmer | |
| 2006/0183484 A1* | 8/2006 | Ruutu et al. | 455/456.1 |
| 2006/0234624 A1 | 10/2006 | Yeh | |
| 2006/0284765 A1 | 12/2006 | Bernhardt et al. | |
| 2007/0049287 A1 | 3/2007 | Dunn | |
| 2007/0067306 A1 | 3/2007 | Dinger et al. | |
| 2007/0120737 A1 | 5/2007 | Moilanen et al. | |
| 2007/0257838 A1 | 11/2007 | Cheng | |
| 2007/0262900 A1 | 11/2007 | Haverkamp et al. | |
| 2007/0263981 A1 | 11/2007 | Ueno et al. | |
| 2007/0286176 A1 | 12/2007 | Flint | |
| 2007/0296632 A1* | 12/2007 | Opshaug | 342/450 |
| 2008/0055154 A1 | 3/2008 | Martucci et al. | |
| 2008/0088506 A1* | 4/2008 | Fischer | 342/357.06 |
| 2008/0183384 A1* | 7/2008 | Gaal et al. | 701/213 |
| 2009/0066564 A1 | 3/2009 | Burroughs et al. | |
| 2009/0069031 A1 | 3/2009 | Burroughs et al. | |
| 2009/0069032 A1 | 3/2009 | Rowland et al. | |

FOREIGN PATENT DOCUMENTS

| | | |
|---|---|---|
| JP | 2000249565 A | 9/2000 |
| JP | 2002544728 A | 12/2002 |
| JP | 2003516057 A | 5/2003 |
| JP | 2003207556 A | 7/2003 |
| JP | 2003524191 A | 8/2003 |
| JP | 2003524356 A | 8/2003 |
| JP | 2003273849 A | 9/2003 |
| JP | 2004235762 A | 8/2004 |
| JP | 2004280701 A | 10/2004 |
| JP | 2005043054 A | 2/2005 |
| JP | 2006053807 A | 2/2006 |
| JP | 2006303904 A | 11/2006 |
| JP | 2006333414 A | 12/2006 |
| JP | 2007158886 A | 6/2007 |
| JP | 2008526146 A | 7/2008 |
| JP | 2009528528 A | 8/2009 |
| RU | 2161317 C1 | 12/2000 |
| RU | 2197780 C2 | 1/2003 |
| RU | 2255433 | 6/2005 |
| TW | 578424 B | 3/2004 |
| TW | I223100 B | 11/2004 |
| TW | 200517675 | 6/2005 |
| TW | I254136 B | 5/2006 |
| TW | I258999 B | 7/2006 |
| TW | 200708757 | 3/2007 |
| TW | 200718972 | 5/2007 |
| WO | WO-9919743 A1 | 4/1999 |
| WO | WO-0069187 A1 | 11/2000 |
| WO | WO-0141468 A2 | 6/2001 |
| WO | WO-0163316 A1 | 8/2001 |
| WO | WO-0163317 A1 | 8/2001 |
| WO | WO-0171375 A2 | 9/2001 |
| WO | WO-03005750 | 1/2003 |
| WO | WO-2005011308 A1 | 2/2005 |
| WO | WO-2005064981 A2 | 7/2005 |
| WO | WO-2006007880 A1 | 1/2006 |
| WO | WO-2006061970 A1 | 6/2006 |
| WO | WO-2006069597 A1 | 7/2006 |
| WO | WO-2006118494 A1 | 11/2006 |
| WO | WO-2007031103 | 3/2007 |
| WO | WO-2007099195 A1 | 9/2007 |

OTHER PUBLICATIONS

3GPP TS 04.31 V8.18.0 (Jun. 2007), "3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP) (Release 1999)", 3GPP TS 04.31 V8.18.0, 3GPP,Jun. 13, 2007,V8.18.0.

ETSI TS 143 059 V7.3.0, "Digital cellular telecommunications system (Phase 2+); Functional stage 2 description of Location Services (LCS) in GERAN (Release 7)", 3GPP TS 43.059 V7.3.0, 3GPP, Jun. 20, 2007, V7.3.0, (May 2007).

ETSI TS 144 031 V7.6.0, Digital cellular telecommunications system (Phase 2+); Location Services (LCS); Mobile Station (MS)—Serving Mobile Location Centre (SMLC); Radio Resource LCS Protocol (RRLP), 3GPP TS 44.031 version 7.6.0 Release 7, Oct. 2007, pp. 1-109.

ETSI TS 144 031 V7.9.0, Digital cellular telecommunications system (Phase 2+); Location Services (LCS); Mobile Station (MS)—Serving Mobile Location Centre (SMLC); Radio Resource LCS Protocol (RRLP), 3GPP TS 144.031 version 7.9.0 Release 7, Jul. 2008, pp. 1-125.

European Search Report—EP13020115—Search Authority—The Hague—Nov. 22, 2013.

International Search Report & Written Opinion—PCT/US2008/076059, International Search Authority—European Patent Office—Feb. 11, 2009.

Kwon K., et al., "A Fast Handoff Algorithm Using Intelligent Channel Scan for IEEE 802.11 WLANs", ICAT 2004, vol. 1, pp. 46-50, 2004.

Taiwan Search Report—TW097134953—TIPO—Jun. 17, 2012.

Taiwan Search Report—TW102125992—TIPO—Nov. 13, 2013.

ETSI GSM 03.71, "Digital cellular telecommunications system (Phase 2+); Location Services (LCS); (Functional description)—Stage 2 (GSM 03.71 version 7.2.1 Release 1998)", GSM 03.71 V7.2.1 (Jan. 2000), ETSI, Feb. 4, 2000.

TSG-GERAN,"LCS for GPRS (WI LCS for GERAN in A/Gb mode)" [online], 3GPP TSG-SA WG2#19 S2-012020, <URL:http://www.3gpp.org/ftp/tsg_sa/WG2_Arch/TSGS2_19/tdocs/S2-012020.zip>, Sep. 4, 2001.

* cited by examiner

DELAYED RADIO RESOURCE SIGNALING IN A MOBILE RADIO NETWORK

CROSS-REFERENCE TO RELATED APPLICATIONS

The present application for patent is a Continuation of patent application Ser. No. 12/208,288 entitled "DELAYED RADIO RESOURCE SIGNALING IN A MOBILE RADIO NETWORK" filed Sep. 10, 2008, pending, and assigned to the assignee hereof and which claims priority under 35 U.S.C. §119(e) to: provisional U.S. Patent Application 60/971,453, titled "GSM Control Plane Positioning Preemption RRLP Implementation for MS and SMLC", filed on Sep. 11, 2007; and provisional U.S. Patent Application 61/012,039, titled "GSM Control Plane Positioning Preemption RRLP Implementation for MS and SMLC", filed on Dec. 6, 2007, the disclosures of which are expressly incorporated by reference herein in their entirety.

BACKGROUND OF THE INVENTION

1. Field of the Invention

The present invention generally relates to communication systems, and more particularly, to enhance position location using a global navigation satellite system.

2. Background of the Invention

It is often desirable, and sometimes necessary, to know the location of a mobile station, (e.g., a cellular phone). The terms "location" and "position" are synonymous and are used interchangeably herein. For example, a user may utilize a mobile station (MS) to browse through a website and may click on location sensitive content. The location of the mobile station may then be determined and used to provide appropriate content to the user. There are many other scenarios in which knowledge of the location of the mobile station is useful or necessary. For example, the FCC's 911 mandate requires carriers to provide enhanced 911 services including geographically locating a mobile station making a 911 emergency services call. The mobile station may be provisioned such that it can obtain location services from a home network and also while roaming in a visited network. The mobile station may communicate with various network entities in the home network in order to determine the location of the mobile station whenever needed.

There are many different types of technologies employed in calculating the location of mobile stations in wireless networks with various levels of success and accuracy. Network based methods include angle of arrival (AOA) using at least two towers, time difference of arrival (TDOA) using multilateration, and location signature using RF fingerprinting to match RF patterns that mobile stations exhibit at known locations. Various mobile station based methods incorporate GPS, Advanced Forward Link Trilateration (A-FLT), Timing Advance/Network Measurement Report (TA/NMR) and/or Enhanced Observed Time Difference (E-OTD).

Another mobile station based method is assisted-GPS (A-GPS), in which a server provides Assistance Data to the mobile station in order for it to have a low Time to First Fix (TTFF), to permit weak signal acquisition, and to optimize mobile station battery use. A-GPS is used as a location technology in isolation or hybridized with other positioning technologies that provide range-like measurements. An A-GPS server provides data to a wireless mobile station that is specific to the approximate location of a mobile station. The Assistance Data helps the mobile station lock onto satellites quickly, and potentially allows the handset to lock onto weak signals. The mobile station then performs the position calculation or optionally returns the measured code phases to the server to do the calculation. The A-GPS server can make use of additional information such as round-trip timing measurements from a cellular base station to the mobile station in order to calculate a location where it may otherwise not be possible; for example when there are not enough GPS satellites visible.

Advances in satellite-based global positioning system (GPS), timing advance (TA), and terrestrial-based Enhanced Observed Time Difference (E-OTD) position fixing technologies enable a precise determination of the geographic position (e.g., latitude and longitude) of a mobile station. As geographic location services are deployed within wireless communications networks, such positional information may be stored in network elements and delivered to nodes in the network using signaling messages. Such information may be stored in a Serving Mobile Location Center (SMLC), a Stand-Alone SMLC (SAS), a Position Determining Entity (PDE), a Secure User Plane Location Platform (SLP) and special purpose mobile subscriber location databases.

One example of a special purpose mobile subscriber location database is the SMLC proposed by the 3rd Generation Partnership Project (3GPP). In particular, 3GPP has defined a signaling protocol for communicating mobile subscriber positional information to and from an SMLC. This signaling protocol is referred to as the Radio Resource LCS (Location Services) protocol, denoted RRLP, and defines signaling messages communicated between a mobile station and an SMLC related to a mobile subscriber's location. A detailed description of the RRLP protocol is found in 3GPP TS 44.031 v7.9.0 (2008 June) 3rd Generation Partnership Project; Technical Specification Group GSM Edge Radio Access Network; Location Services (LCS); Mobile Station (MS)-Serving Mobile Location Center (SMLC) Radio Resource LCS Protocol (RRLP) (Release 7).

In addition to the United States Global Positioning System (GPS), other Satellite Positioning Systems (SPS), such as the Russian GLONASS system or the proposed European Galileo System may also be used for position location of a mobile station. However, each of the systems operates according to different specifications.

One weakness of a satellite based position location system is the time taken to acquire an accurate position fix. Typically, position accuracy is traded off for acquisition speed and visa versa. That is, a more accurate fix takes more time. Accordingly, there is a need for a communication system, including a global navigation satellite system (GNSS), which can determine a position location for a mobile station based on satellite signals sent from two or more satellites to provide further efficiencies and advantages for position location including enhanced accuracy. A need exists to enhance accuracy while not detrimentally impacting the acquisition speed or a final acquisition time of acquiring a position fix of a mobile station, for example, during an emergency services (ES) call or value added services (VAS) session.

SUMMARY

Some embodiments of the present invention provide for a method of reducing rebids of Measure Position Request messages between a network and a mobile station in a wireless network, the method comprising: transmitting an RRLP Assistance Data message; receiving an RRLP Assistance Data Ack message; waiting until a predetermined time, wherein the predetermined time is based on a time location data is needed; transmitting, at the predetermined time, RRLP Measure Position Request message comprising a network response time and a network accuracy, wherein the network response time comprises a value representing a shortened response time of not greater than 4 seconds, wherein the network accuracy comprises a value representing low accuracy of not less than 100 meters, and wherein the RRLP Measure Position Request message comprises no Assistance Data; and receiving, at a time before the location data is needed, a RRLP Measure Position Response message comprising the location data.

Some embodiments of the present invention provide for a network for reducing rebids of Measure Position Request messages between the network and a mobile station in a wireless network, the method comprising: a timer to wait until a predetermined time, wherein the predetermined time is based on a time location data is needed; a transmitter to transmit, at the predetermined time, Measure Position Request message comprising a network response time and a network accuracy; and a receiver to receive, at a time before the location data is needed, a Measure Position Response message comprising the location data. The network wherein the network response time comprises a value representing a shortened response time of not more than 4 seconds. The network wherein the network accuracy comprises a value representing low accuracy of not less than 100 meters. The network wherein the Measure Position Request comprises no Assistance Data. The network wherein the Measure Position Request message comprises an RRLP Measure Position Request message. The network wherein the Measure Position Response message comprises an RRLP Measure Position Response message.

Some embodiments of the present invention provide for a computer-readable product comprising a computer-readable medium comprising: code for causing at least one computer to wait until a predetermined time, wherein the predetermined time is based on a time location data is needed; code for causing at least one computer to transmit, at the predetermined time, Measure Position Request message comprising a network response time and a network accuracy; and code for causing at least one computer to receive, at a time before the location data is needed, a Measure Position Response message comprising the location data. The computer-readable product wherein the network response time comprises a value representing a shortened response time not greater than 4 seconds. The computer-readable product wherein the network accuracy comprises a value representing low accuracy not less than 100 meters. The computer-readable product wherein the Measure Position Request comprises no Assistance Data. The computer-readable product wherein the computer-readable medium comprising further comprises: code for causing at least one computer to transmit an Assistance Data message; and code for causing at least one computer to receive an Assistance Data Ack message. The computer-readable product wherein the Measure Position Request message comprises an RRLP Measure Position Request message. The computer-readable product wherein the Measure Position Response message comprises an RRLP Measure Position Response message.

Some embodiments of the present invention provide for a method, in a network, for minimizing rebids between the network and a mobile station in a wireless network, the method comprising: sending a Request message thereby opening a session in the mobile station; determining, while the session is open, an RR message is ready to be sent to the mobile station; avoiding aborting the session with the RR message; and receiving a Response message thereby closing the session. The method wherein the act of avoiding aborting the session comprises: waiting to send the RR message; and sending the RR message after the session is closed. The method wherein the act of avoiding aborting the session comprises dropping the RR message. The method wherein the Request message comprises an RRLP Measure Position Request message. The method wherein the Request message comprises an RRLP Assistance Data message.

Some embodiments of the present invention provide for a network for minimizing rebids between the network and a mobile station in a wireless network, the network comprising: means for sending a Request message thereby opening a session in the mobile station; means for determining, while the session is open, an RR message is ready to be sent to the mobile station; means for avoiding aborting the session with the RR message; and means for receiving a Response message thereby closing the session. The method wherein the means for avoiding aborting the session comprises: means for waiting to send the RR message; and means for sending the RR message after the session is closed. The method wherein the means for avoiding aborting the session comprises dropping the RR message. The method wherein the Request message comprises an RRLP Measure Position Request message. The method wherein the Request message comprises an RRLP Assistance Data message.

Some embodiments of the present invention provide for a network for minimizing rebids between the network and a mobile station in a wireless network, the network comprising: a transmitter to send a Request message thereby opening a session in the mobile station; logic to determine, while the session is open, an RR message is ready to be sent to the mobile station; logic to avoid aborting the session with the RR message; and a receiver to receive a Response message thereby closing the session. The network wherein the logic to avoid aborting the session comprises: a timer to wait to send the RR message; wherein the transmitter is further to send the RR message after the session is closed. The network wherein the logic to avoid aborting the session comprises logic to drop the RR message. The method wherein the Request message comprises an RRLP Measure Position Request message. The method wherein the Request message comprises an RRLP Assistance Data message.

Some embodiments of the present invention provide for a computer-readable product comprising a computer-readable medium comprising: code for causing at least one computer to send a Request message thereby opening a session in the mobile station; code for causing at least one computer to determining, while the session is open, an RR message is ready to be sent to the mobile station; code for causing at least one computer to avoid aborting the session with the RR message; and code for causing at least one computer to receive a Response message thereby closing the session. The method wherein the code for causing at least one computer to avoid aborting the session comprises: code for causing at least one computer to wait to send the RR message; and code for causing at least one computer to send the RR message after the session is closed. The method wherein the code for causing at least one computer to avoid aborting the session comprises code for causing at least one computer to drop the RR message. The method wherein the Request message comprises an RRLP Measure Position Request message. The method wherein the Request message comprises an RRLP Assistance Data message.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

Figure 1A:
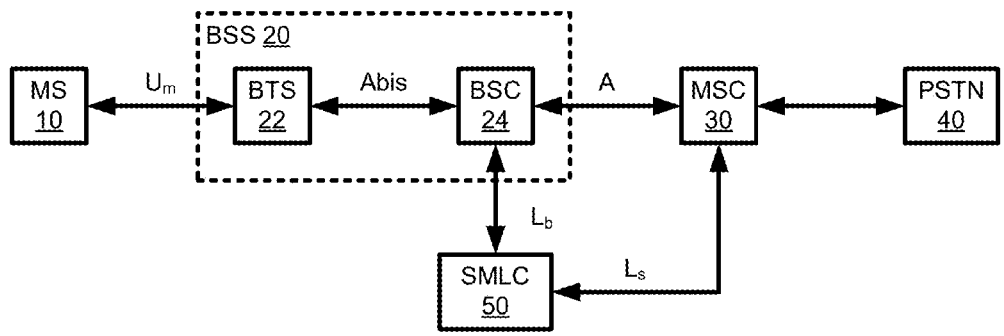
FIGS. 1A, 1B and 1C show various components and interfaces in a wireless network.

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory.

A procedure, computer executed step, logic block, process, etc., are conceived here to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof. In a hardware implementation, for example, a processing unit may be implemented within one or more application specific integrated circuits (ASICs), digital signal processors (DSPs), digital signal processing devices (DSPs), programmable logic devices (PLDs), field programmable gate arrays (FPGAs), processors, controllers, micro-controllers, microprocessors, electronic devices, other devices units designed to perform the functions described herein, and/or combinations thereof.

Throughout this specification, reference may be made to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to physical media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects. The term "storage medium" does not apply to vacuum.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000 or Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

A device and/or system may estimate a device's location based, at least in part, on signals received from satellites. In particular, such a device and/or system may obtain "pseudorange" measurements comprising approximations of distances between associated satellites and a navigation satellite receiver. In a particular example, such a pseudorange may be determined at a receiver that is capable of processing signals from one or more satellites as part of a Satellite Positioning System (SPS). Such an SPS may comprise, for example, a Global Positioning System (GPS), Galileo, Glonass, to name a few, or any SPS developed in the future. To determine its position, a satellite navigation receiver may obtain pseudorange measurements to three or more satellites as well as their positions at time of transmitting. Knowing the satellite's orbital parameters, these positions can be calculated for any point in time. A pseudorange measurement may then be determined based, at least in part, on the time a signal travels from a satellite to the receiver, multiplied by the speed of light. While techniques described herein may be provided as implementations of location determination in a GPS and/or Galileo types of SPS as specific illustrations, it should be understood that these techniques may also apply to other types of SPS, and that claimed subject matter is not limited in this respect.

Techniques described herein may be used with any one of several SPS, including the aforementioned SPS, for example. Furthermore, such techniques may be used with positioning determination systems that utilize pseudolites or a combination of satellites and pseudolites. Pseudolites may comprise ground-based transmitters that broadcast a Pseudo Random Noise (PRN) code or other ranging code (e.g., similar to a GPS or CDMA cellular signal) modulated on an L-band (or other frequency) carrier signal, which may be synchronized with GPS time. Such a transmitter may be assigned a unique PRN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

As used herein, a handheld mobile device or a mobile station (MS) refers to a device that may from time to time have a position or location that changes. The changes in position and/or location may comprise changes to direction, distance, orientation, etc., as a few examples. In particular examples, a mobile station may comprise a cellular telephone, wireless communication device, user equipment, laptop computer, other personal communication system (PCS) device, and/or other portable communication device. A mobile station may also comprise a processor and/or computing platform adapted to perform functions controlled by machine-readable instructions.

This application is related to the following applications, each filed concurrently with this application and each included in their entirety herein: U.S. patent application Ser. No. 12/208,249, entitled "Optimized Ordering of Assistance Data in a Mobile Radio Network" by Kirk Allan Burroughs; U.S. patent application Ser. No. 12/208,270, entitled "Improve GPS Yield For Emergency Calls in a Mobile Radio Network" by Thomas Rowland; and U.S. patent application Ser. No. 12/208,297, entitled "Dynamic Measure Position Request Processing in a Mobile Radio Network" by Thomas Rowland.

Figure 1B:
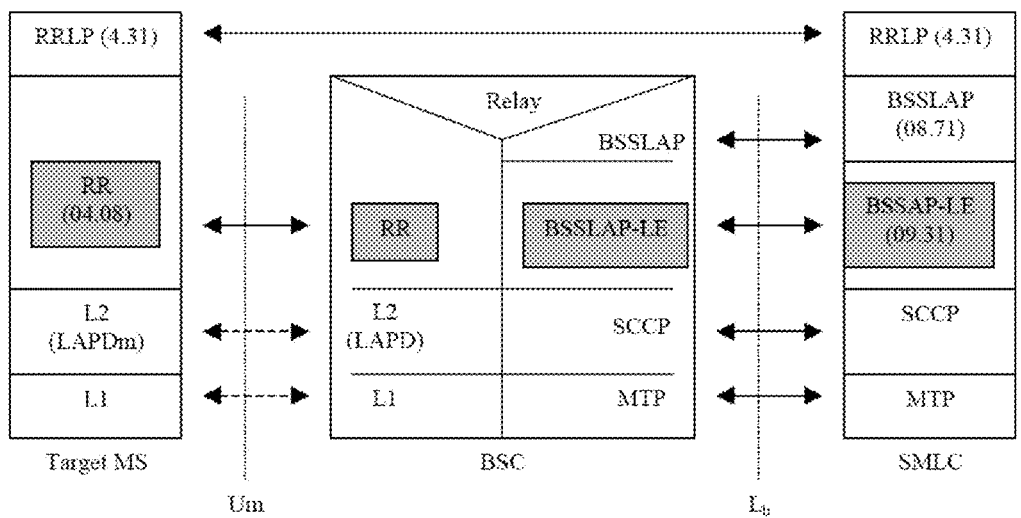
Figure 1C:
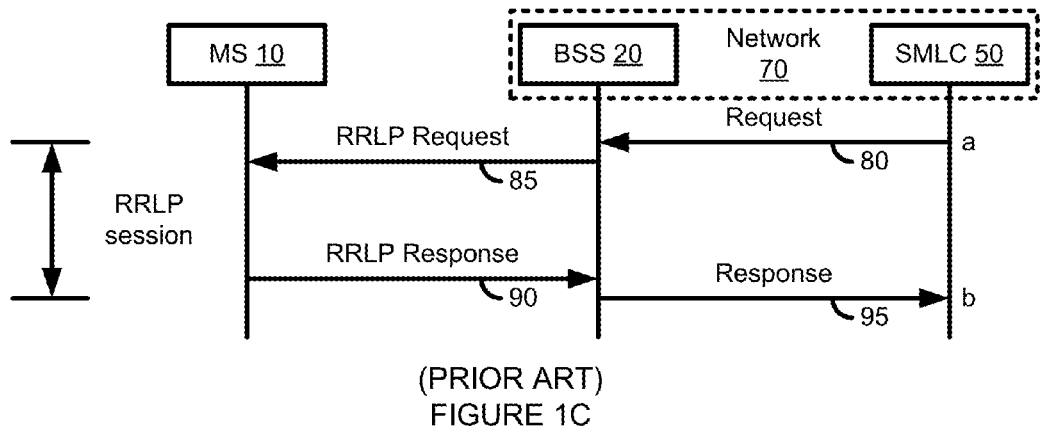

FIGS. 1A, 1B and 1C show various components and interfaces in a wireless network. For simplicity, the description below uses general terminology used in wireless networks or specific terminology used with reference to a specific standard though the techniques described herein may be applicable to several different wireless network standards. For example, such a wireless network includes Code Division Multiple Access (CDMA) system, which is a high-capacity digital wireless technology that was pioneered and commercially developed by QUALCOMM Incorporated. Another wireless network includes Global System for Mobile Communications (GSM), which used an alternative digital wireless technology. Yet another wireless network includes Universal Mobile Telephone Service (UMTS), which is a next generation high capacity digital wireless technology.

FIG. 1A includes a mobile station (MS 10), a base station subsystem (BSS 20) including a base transceiver station (BTS 22) and a base station controller (BSC 24), a mobile switching center (MSC 30), a public switched telephone network (PSTN) and a serving mobile location center (SMLC). The MS 10 is any mobile wireless communication device, such as a cell phone that has a baseband modem for communicating with one or more base stations. MSs referenced in this disclosure include a GPS receiver or equivalent receiver to provide position determination capabilities. The term GPS used below is used in the generic sense to mean a satellite or pseudosatellite system. The MS 10 and the BTS 22 communicate wirelessly over an RF air interface referred to as the $U_m$ interface. One or more MSs 10 may communicate with the BTS 22 or BSS 20 at one time. Internally to the BSS 20, the BTS 22 may communicate to the BSC 24 over an Abis interface. One BSC 24 may support several BTSs 22 in a deployed network. Herein, when referring to $U_m$ air interface messages from the network (downlink) and from the MS 10 (uplink), these messages may be referred to as being communicated using a BTS 22 or equivalently using a BSS 20. An $L_b$ interface couples a BSC 24 with an SMLC 50. When referring to $L_b$ interface downlink and uplink messages, these messages may be referred to as being communicated using a BSC 24 or equivalently using a BSS 20. One or more BSCs 24 and/or BSSs 20 may be coupled to the MSC 30 using an A interface.

The MSC 30 connects a switched circuit from a PSTN 40 to the MS 10 to provide a voice call to the public network. Other network elements or network components may be connected to the BSS 20, MSC 30 and PSTN 40 to provide other services.

For example, the SMLC 50 may be coupled to the network to provide location services, and is shown connected to the BSC 24 over an $L_b$ interface. The SMLC 50 may also be connected to the wireless network via the MSC 30 and an $L_s$ interface. The SMLC 50 provides overall co-ordination for locating mobile stations and may also calculate the final estimated location and estimated accuracy achieved. The SMLC 50 is used generically herein to mean a positioning server, which are also referred to as a Position Determination Entity (PDE) within CDMA networks, Serving Mobile Location Center (SMLC) within GSM networks, and Stand-Alone (A-GPS) SMLC (SAS) within WCDMA cellular networks.

A positioning server is a system resource (e.g. a server) typically within the wireless network, working in conjunction with one or more GPS reference receivers, which is capable of exchanging GPS related information with an MS. In an MS-Assisted A-GPS session, the positioning server sends GPS Assistance Data to the MS to enhance the signal acquisition process. The MS may return pseudo-range measurements back to the positioning server, which is then capable of computing the position of the MS. Alternatively, in an MS-Based A-GPS session, the MS sends back computed position results to the positioning server.

FIG. 1B shows a layered model of the $U_m$ and $L_b$ interfaces. Layers in the MS 10 (target MS) include a first layer referred to as the physical layer, layer one or L1, a second layer referred to as L2 (LAPDm), a third layer referred to as a radio resource (RR) layer modeled after the GSM 04.08 specification, and finally an application layer. In this case, the application layer is a Radio Resource Location Protocol (RRLP) defined in the GSM 04.31 and GSM 04.35 recommendations. The BSS 20 (shown as BSC 24) has a corresponding layered model including L1, L2 (LAPD) and RR layers, with the RRLP messages passing through the BSS 20. The BSS 20 relays the lower layers as required to the SMLC 50 over the $L_b$ interface. The layers include MTP, SCCP BSSLAP-LE and BSSLAP layers, which correspond to MTP, SCCP BSSLAP-LE and BSSLAP layers within the SMLC 50. For additional information on the BSSAP-LE and BSSLAP interfaces, see GSM 09.21 and GSM 08.71 recommendations.

Messages passing from network element to network element may pass through multiple different interfaces and corresponding protocols. For example, a message passing from the positioning server SMLC 50 to the BSS 20 to the MS 10 will be communicated as a first message across the $L_b$ interface, possibly another message across the Abis interface and a final message across the $U_m$ interface. Generally, in the present disclosure, a message will be referred to by its application layer and air interface name for simplicity. For example, a request from the positioning server SMLC 50 destined to the MS 10 may be referred to by the air interface $U_m$ application layer name of RRLP Measure Position Request. Additionally, for clarity sake, the BSS 20 and the SMLC 50 may be referred to collectively as the network 70, which may include a BTS 22, a BSC 24 and an SMLC 50 or may include a BSS 20 and an SMLC 50.

FIG. 1C shows a message flow diagram of a normal RRLP session. At time a, the SMLC 50 sends a Request message 80 to the BSS 20 across the $L_b$ interface.

The BSS 20 re-packages and forwards this request as an RRLP Request 85 transmitted across the downlink $U_m$ air interface to the MS 10. Internally, the MS 10 begins an RRLP session and eventually replies across the uplink $U_m$ air interface with an RRLP Response message 90. The BSS 20 again re-packages and forwards this reply to the SMLC 50 in a Response message 95 across the $L_b$ interface, which the SMLC 50 receives as time b. Hereinafter, such request and responses from and to the SMLC 50 will be referred to as RRLP requests and RRLP responses.

The 3GPP RRLP application layer currently supports five messages. The first message is an RRLP Measure Position Request message used on the downlink. The network 70 uses this message to request location measurements or a location estimate from the MS 10. The message includes instructions for the MS 10 and may also include Assistance Data for the MS 10. Assistance Data is described in additional detail below. The second message is an RRLP Measure Position Response message used on the uplink and complements the RRLP Measure Position Request message. The MS 10 uses this message to respond to the network 70 with position estimate information and other position related information. The RRLP Measure Position Request message and the RRLP Measure Position Response message operate together to begin and terminate an RRLP session.

The third and fourth messages also operate together to begin and terminate an RRLP session. The third message is another downlink message referred to an RRLP Assistance Data message, which the network 70 uses to send Assistance Data to the MS 10. Assistance Data optionally includes Enhanced Observed Time Difference (E-OTD) reference BTS information (e.g., BTS signaling and position information) and E-OTD measurement information for up to eight additional BTSs. The fourth message is an RRLP Assistance Data Acknowledgment (Ack) message used on the uplink. The RRLP Assistance Data Ack message is simply used by the MS 10 to acknowledge, to the network 70, receipt of the RRLP Assistance Data message. The fifth message is an atypical message called an RRLP Protocol Error, which may be used either on the downlink or the uplink to report an error in the protocol.

Figure 2:
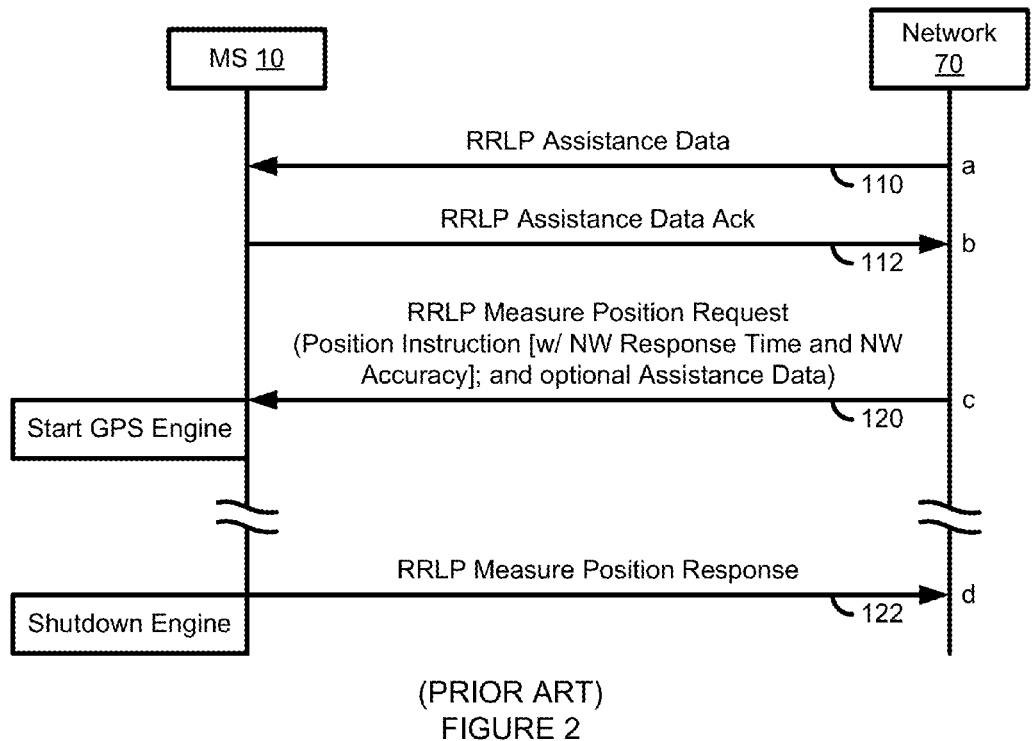
FIG. 2 shows a message flow diagram of a typical position location process using RRLP sessions.

FIG. 2 shows a message flow diagram of a typical position location process using RRLP sessions. The MS 10 and the network 70 may be viewed as a client-server model with the MS 10 acting as the client and the network 70 acting as the server. An RRLP session begins with a request from the network 70 and typically ends with a response from the MS 10. At time a, a position location process begins with the network 70 and MS 10 communicating an RRLP Assistance Data message 110. That is, the network 70 sends the an RRLP Assistance Data message 110 to the MS 10 and the MS 10 begins a new RRLP session on receipt of the RRLP Assistance Data message 110. Normally, shown at time b, the MS 10 completes the RRLP session with an acknowledgement response referred to as an RRLP Assistance Data Ack message 112.

At time c, the network 70 sends an RRLP Measure Position Request message 120, which includes a position instruction and optionally Assistance Data. The position instruction from the network 70 includes a maximum response time (NW Response) set by the network (NW) and minimum accuracy (NW Accuracy), also set by the network (NW). In response to receiving the RRLP Measure Position Request message 120, a known mobile station starts its GPS engine. GPS is used generically to refer to a positioning system using satellite vehicles (SVs) and/or pseudo-satellites. Engine is also used generically as hardware and/or firmware and/or software that operates to process data. The MS 10 then determines one or more position fixes with each having an estimated uncertainty.

Once the estimated uncertainty is less than or equal to the minimum network accuracy (NW Accuracy) signaled by the network 70, or once the MS 10 has been computing a fix for as long as allowed by the network response time (NW Response) parameter, location processing stops. As shown at time d, the MS 10 reports the computed fix in an RRLP Measure Position Response message 122 and also shuts down the GPS engine. The difference in time between time references c and d may be substantial (e.g., 45 seconds to several minutes). One goal in position determination is to minimize this acquisition time. Another goal is to reduce the uncertainty of a provided fix.

Figure 3:
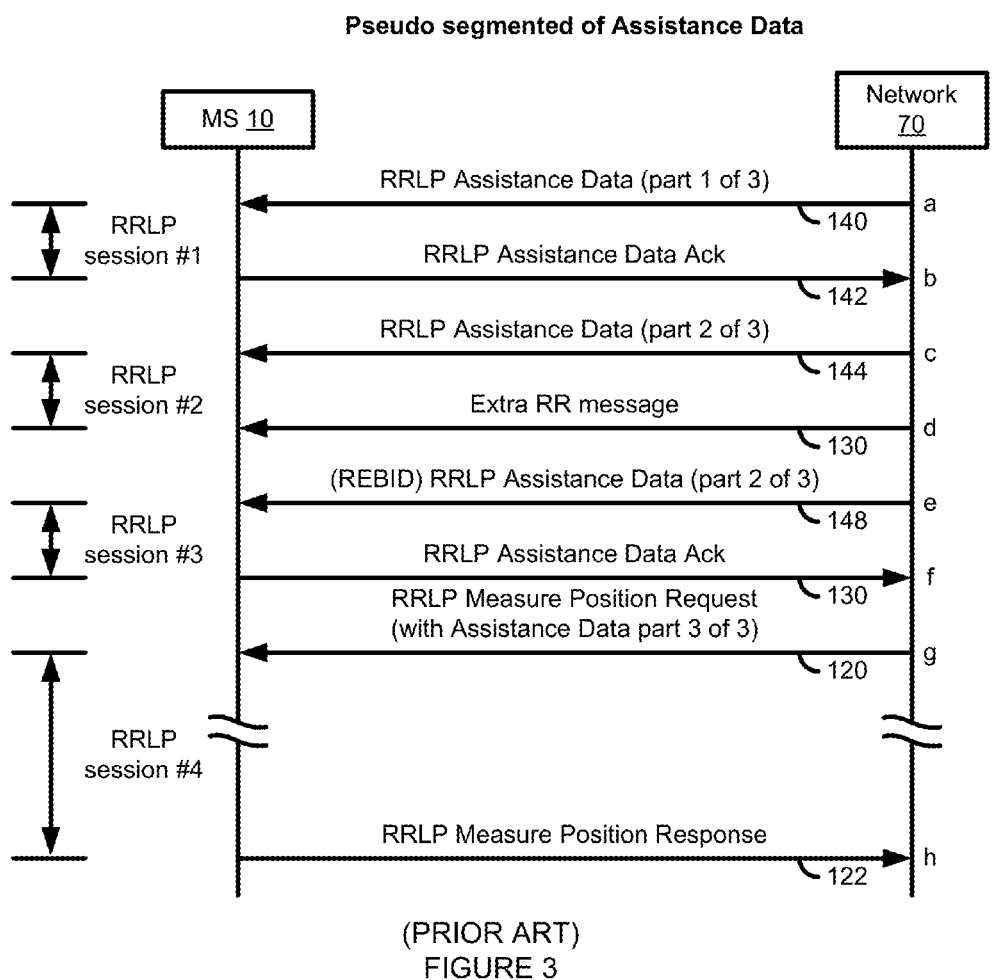
FIG. 3 shows pseudo segmentation of Assistance Data.

FIG. 3 shows pseudo segmentation of Assistance Data. Assistance Data may include position data on one or more satellite vehicles (SVs). Because the Assistance Data typically contains information on 8 to 12 or more satellites, the Assistance Data is separated into multiple blocks of pseudo segmented Assistance Data messages, with each block containing information on one, two, three or four satellites. In the example shown, the Assistance Data is segmented into three pseudo segments. The first two blocks may contain information on three or four satellites and the final block may contain information on one, two or three satellites for a total of seven to eleven satellites for the example shown.

The first block of the Assistance Data is communicated from the network 70 to the MS 10 at time a in a first RRLP Assistance Data message 140. Once received, a first RRPL session begins but quickly terminates when the MS 10 sends an RRLP Assistance Data Ack message 142 to the network 70 at time b.

The second block of the Assistance Data is communicated from the network 70 to the MS 10 at time c in a second RRLP Assistance Data message 144. Once received, a second RRPL session begins. In this example at time d, the MS 10 does not have time to transmit an acknowledgement message before it receives a second RR message (referred here as an extra RR message 130), which terminates the RRLP session created by message 144. The extra RR message may be any of several different RR messages. For example, a higher priority RR message such as a handover message may have been transmitted to the MS 10.

A session is termed preempted if either the MS 10 receives a part of the downlink RRLP message or none of the downlink RRLP message. Preemption occurs when a message is placed in an outgoing queue of the network for transmission. In some cases, before the downlink RRLP message may be complete transmitted, the remainder of the message not yet transmitted is purged from the queue for the higher priority message. In these cases, the MS 10 may have received some but not the entire downlink RRLP message. In other cases, the downlink RRLP message is purged before the first bit of the message is even transmitted over the air interface. In these cases, the session is also considered preempted, however, the MS 10 has no knowledge of the session's existence. Often a preemption occurs when a downlink RRLP message is long, or when longer messages are ahead of it (i.e., other messages scheduled for an earlier transmission time) in the same downlink queue.

On the other hand, a session is referred to as aborted if the MS 10 receives the entire downlink RRLP message but has not yet completely sent a response, such as an RRLP Assistance Data Ack message. An abortion usually occurs when the MS 10 takes a relatively long period of time to respond to a downlink RRLP message.

In both the preemption and abortion cases, the existing session in the MS 10 and/or network 70 is terminated. One goal is for the MS 10 to quickly respond to the downlink RRLP messages, thereby minimizing aborted sessions. Another goal is for the network to send shorter downlink RRLP messages thereby keeping the queue less full and minimizing preempted sessions. Pseudo segmentation targets the second goal of having shorter downlink RRLP messages thus reducing the chance of a preempted session but does not address the first goal of quickly responding to downlink messages as described further below with processing associated with RRLP Measure Position Request messages.

Hereinafter, the terms abortion, abort or aborted will be used in reference to terminating a session caused by either an abortion session due to a receipt of an extra RR message or a preemption in the downlink queue by a higher priority downlink message.

To recover from an aborted session, the network 70 transmits a rebid message. A rebid message is a subsequent transmission of a message previously placed in a downlink queue. In the example shown at time e, the second block of Assistance Data is included in a rebid RRLP Assistance Data message 148, which begins a third RRLP session at the MS 10. The MS 10 acknowledges receipt with another RRLP Assistance Data Ack message 150 to the network 70 at time f.

The final block of Assistance Data is transmitted from the network 70 to the MS 10 at time g in an RRLP Measure Position Request message 120, which is received by the MS 10 and begins a forth session in this example. The MS 10 is now instructed to begin location determination, which may take 10s of seconds to several minutes. During the period from receiving the instruction to transmitting a response, the session is vulnerable to session abortions by an extra RR message. In this example, the final session is not aborted but rather the MS 10 responds with an RRLP Measure Position Response messages 122 at time h.

Figure 4:
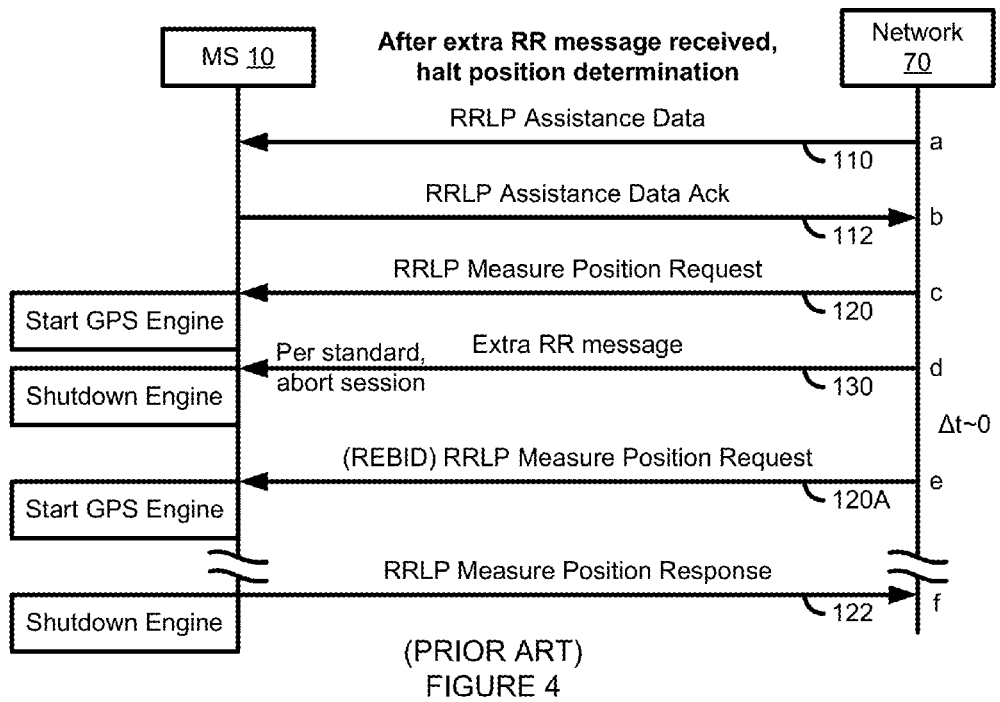
FIGS. 4 and 5 illustrate halting position determination based on a MS receiving an extra RR message.
Figure 5:
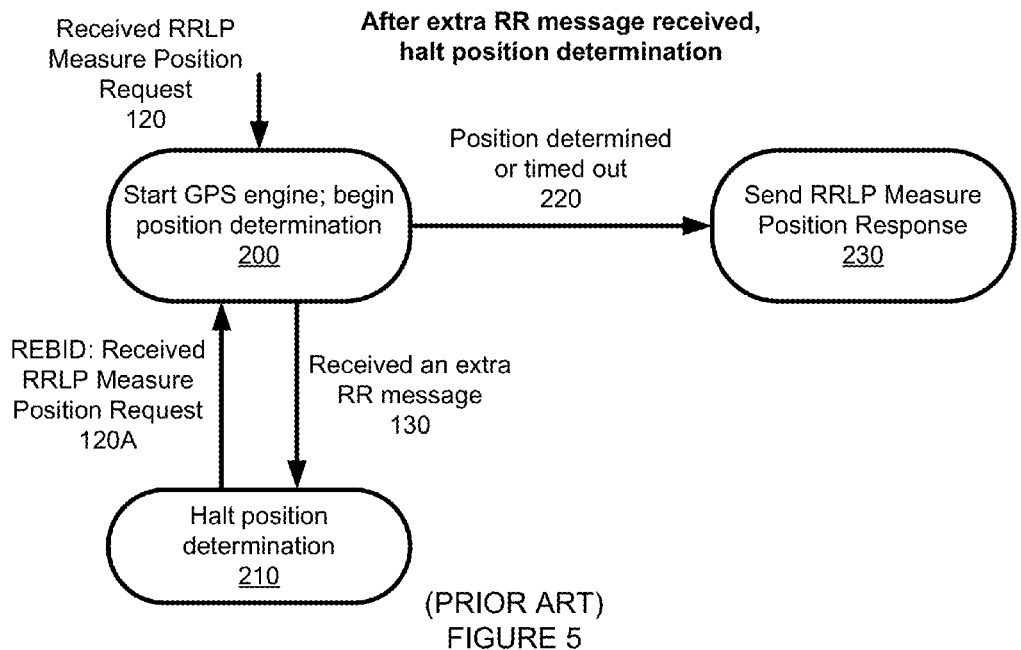

FIGS. 4 and 5 illustrate halting position determination based on a MS 10 receiving an extra RR message. In FIG. 4 at time a, the network 70 sends the MS 10 an RRLP Assistance Data message 110, then at time b, the MS 10 replies with an RRLP Assistance Data Ack message 112. The network 70 and the MS 10 may repeat this exchange of messages several times to provide next to all of the Assistance Data to the MS 10 prior to starting the GPS engine. At time c, the network 70 sends the MS 10 an RRLP Measure Position Request message 120 with the final block of Assistance Data. At this point, the MS 10 starts its GPS engine and begins position location.

At time d, the network 70 sends the MS 10 an extra RR message 130 (that is, a message that the MS 10 was not expecting to receive because it is in an ongoing session). This extra RR message 130, which occurred before the MS 10 was able to transmit a reply message, causes the MS 10 to abort the current session started by the RRLP Measure Position Request message 120. As part of aborting the session, the MS 10 shuts down the GPS engine, terminates the position location process, responds to the extra RR message 130 and waits for the next request from the network 70. After a short delay of Δt at time e (where Δt=e−d), the network 70 transmits a rebid of the RRLP Measure Position Request message 120A, which cause the MS 10 to restart its GPS engine and begin position location again. This process of sending rebids of message 120A followed by an interruption by an extra RR message 130 may occur several times before the MS 10 is able to determine its position within the network response time and accuracy parameters provided. At time f, the MS 10 reports a determine position to the network 70 in an RRPL Measure Position Response message 122.

FIG. 5 shows this message exchange in state diagram form. When the MS 10 receives an RRLP Measure Position Request message 120, the MS 10 enters state 200, which starts the GPS engine and begins position determination. In normal uninterrupted operation, the MS determines a position 220 and reports the position to the network by entering state 230, which sends an RRPL Measure Position Response message 122. When a fix cannot be determined within the provided network response time (e.g., when a response time timeout occurs), the MS 10 may exit state 200 and enter state 230 where the MS 10 replies with the RRPL Measure Position Response message 122 containing a fix with an accuracy worse than requested by the network.

The state diagram shows other situations that may occur. For example, the MS 10 will exit state 200 and enter state 210 when it receives an extra RR message 130. At state 210, the MS 10 shuts down the GPS engine and halts position determination. The MS 10 exits state 210 and reenters state 200 when it receives a rebid RRLP Measure Position Request message 120A. Eventually, the MS 10 ordinarily either determines a position or times out 220 and enters state 230 to respond with the RRPL Measure Position Response message 122.

In the position location process described above, an MS 10 waits until an RRLP Measure Position Request message 120 before starting its GPS engine and shuts down its GPS engine when it receives an extra RR message 130, thereby minimizing the duration of time that the GPS engine is running. By starting the GPS engine in response to receiving the RRLP Measure Position Request message 120, the MS 10 knows the network 70 needs a position fix. In any other case, no guarantee exists that the network 70 will request a position fix from the MS 10. Therefore by not starting before this time, the MS 10 saves battery power. The MS 10 also saves battery power by shutting down the GPS engine once the RRLP session is over (e.g., as a result of an abortion or reporting the position fix).

In accordance with some embodiments of the present invention, advantages may be realized by not following this known procedure and instead starting the GPS engine in anticipation of receiving an RRLP Measure Position Request message 120. Furthermore, advantages may be realized by not shutting down the GPS engine once the RRLP session is over. At the cost of battery power, the GPS engine may be started early (i.e., before an RRLP Measure Position Request message 120 is received) and may continue the position determination process even if the RRLP session is terminated.

Figure 6:
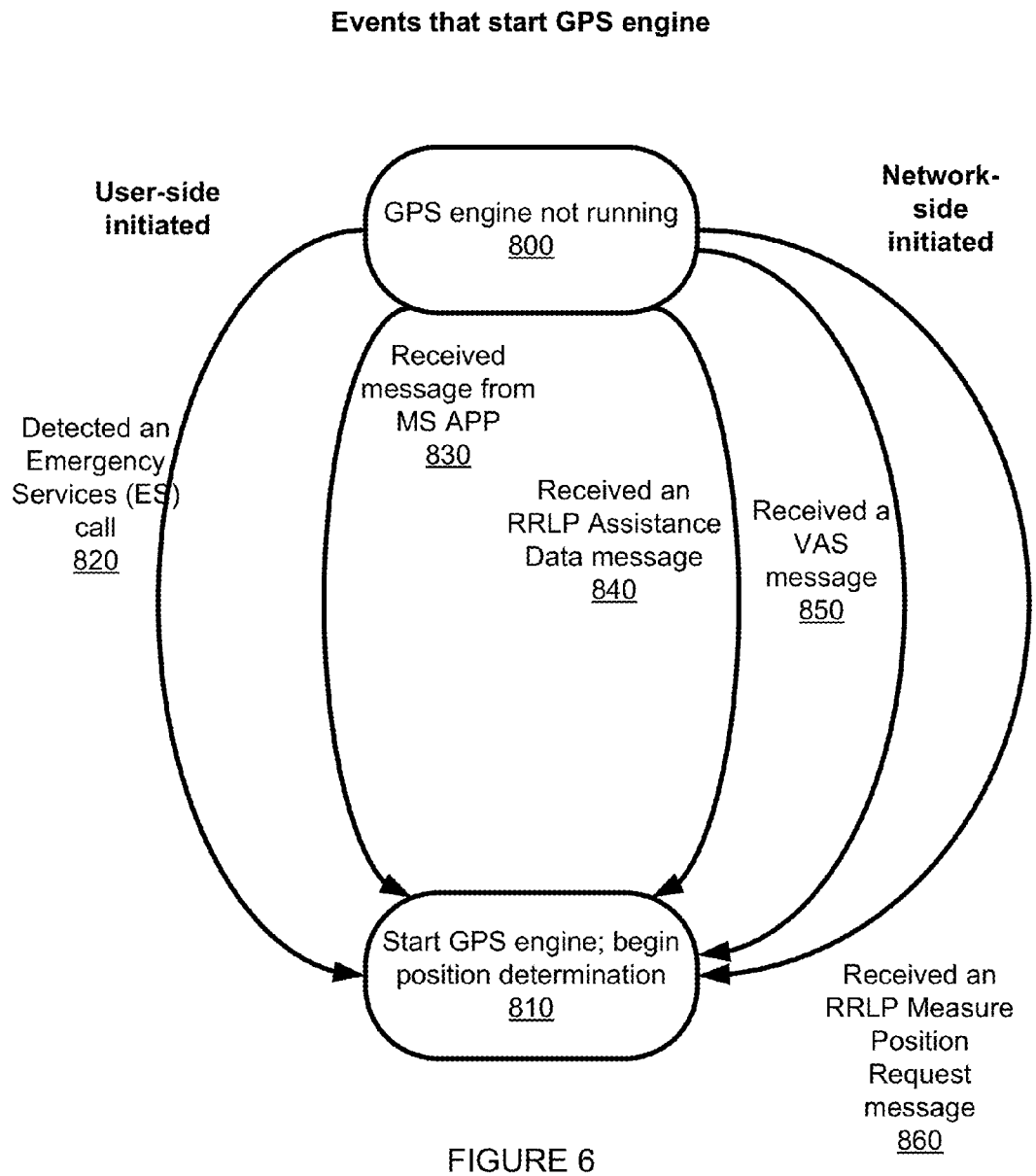
FIGS. 6 and 7 show events that start and shutdown a GPS engine, in accordance with embodiments of the present invention.
Figure 7:
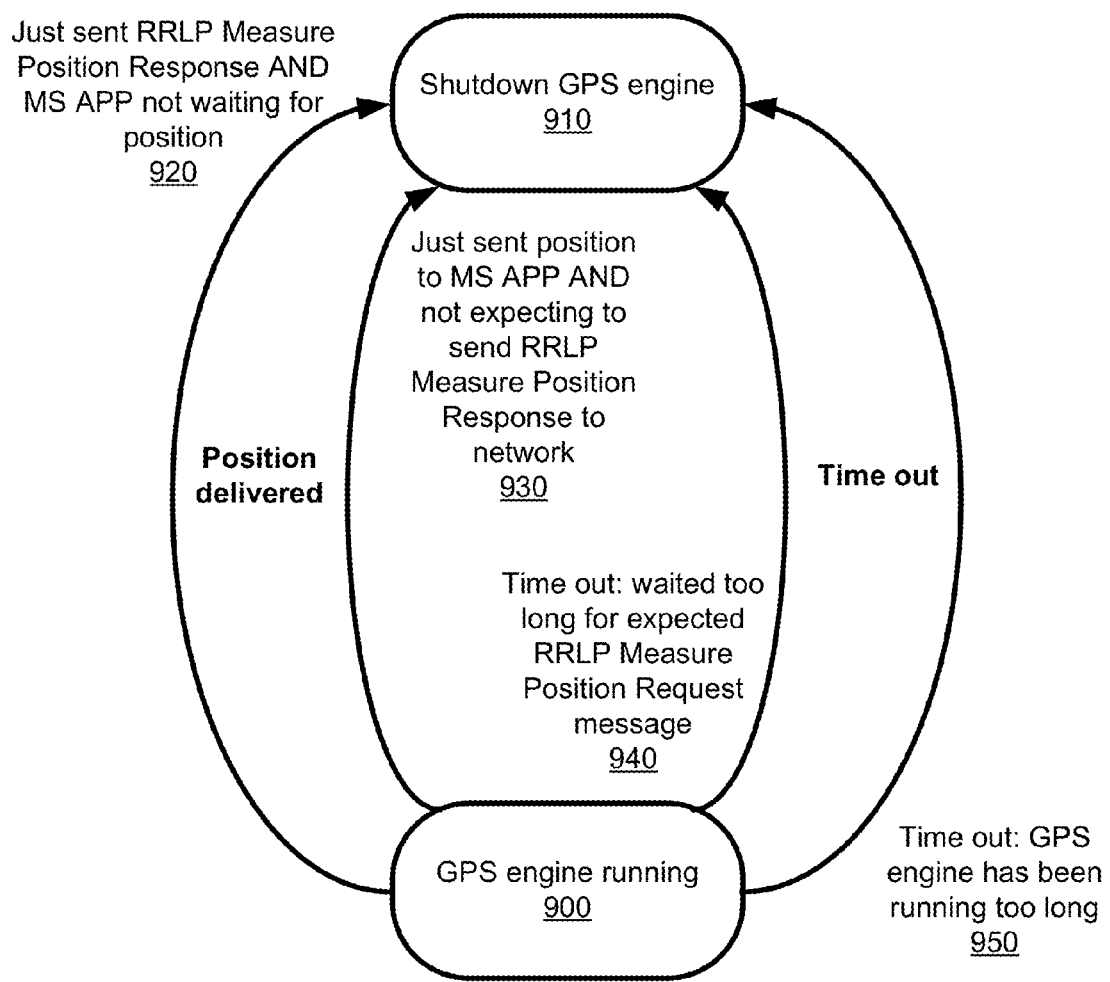

FIGS. 6 and 7 show events that start and shutdown a GPS engine, in accordance with embodiments of the present invention. The state diagram of FIG. 6 shows two states: state 800 where the GPS engine is not running and state 810 where the GPS engine has started and the position determination process has begun. Several user-side and network-side triggering events may occur that initiate an early starting of the GPS engine in anticipation of a future receipt of an RRLP Measure Position Request message 120. A triggering event occurs after beginning a runtime operation. That is, a triggering event is not simply turning on the mobile station, which puts the mobile station into runtime operation. Some devices always run a GPS engine thus no triggering event exists to start a GPS engine. A triggering event is not a user operation to specifically turn on a GPS location function of the mobile station. A triggering event is an event that typically does not turn on a GPS engine. Also, triggering event occurs prior to receiving an RRLP Measure Position Request message, which is a message that typically turns on a GPS engine.

First at 820, if the MS 10 detects the triggering event that an Emergency Services (ES) call has been initiated, the MS 10 may transition from state 800 to state 810. Another user-side initiated transition may occur if the MS 10 received a message from a mobile station application (MS App) indicating a position fix is needed. The network-side events may also initiate transition from state 800 to state 810. For example at 840, if the MS 10 receives the triggering event of a new RRLP Assistance Data message, the MS 10 may transition from state 800 to state 810. At 850, if the MS 10 receives the triggering event of a value added services (VAS) message, the MS 10 may transition from state 800 to state 810. For completeness, at 860, the known process of transitioning states is shown by receipt of an RRLP Measure Position Request message 120.

Besides starting early as described with reference to FIG. 6, shutting down of the GPS engine may be advantageously postponed as shown in FIG. 7, which also includes two states. In state 900, the GPS engine is running (e.g., due to one of the events described above). In state 910, the GPS engine is shut down. Several events may trigger transitioning from state 900 to state 910 to shut down the GPS engine. For example, a position may be derived or a time out may occur. At 920, the transition occurs as a result of recently sending an RRPL Measure Position Response message 122 when there is no other significant need for the engine to continue running such as an MS APP waiting for a better position fix. The transition may also occur when a position fix has just been reported to an MS APP and the MS 10 is not anticipating an RRLP Measure Position Request message 120 and not expecting to send an RRPL Measure Position Response message 122.

Abnormal cases may also cause the transition. For example at 940, if the MS 10 has been anticipating an RRLP Measure Position Request message 120 (e.g., due to events 820 or 840 described above) but has not received the message within a predetermined period of time (e.g., 45, 60 or 90 seconds or a value selected from a range of times of 30-60, 30-90, 30-120, 30-180, 30-240, 60-90, 60-120, 60-180, 60-240, 90-120, 90-180, 90-240, 120-180, 120-240, or the like as would be understood by someone skilled in the art), the MS 10 may shut down its GPS engine. Similarly at 940, if the GPS engine has been running too long (e.g., 120 or 180 seconds), the MS 10 may time out and shutdown the GPS engine to save batter power.

Figure 8:
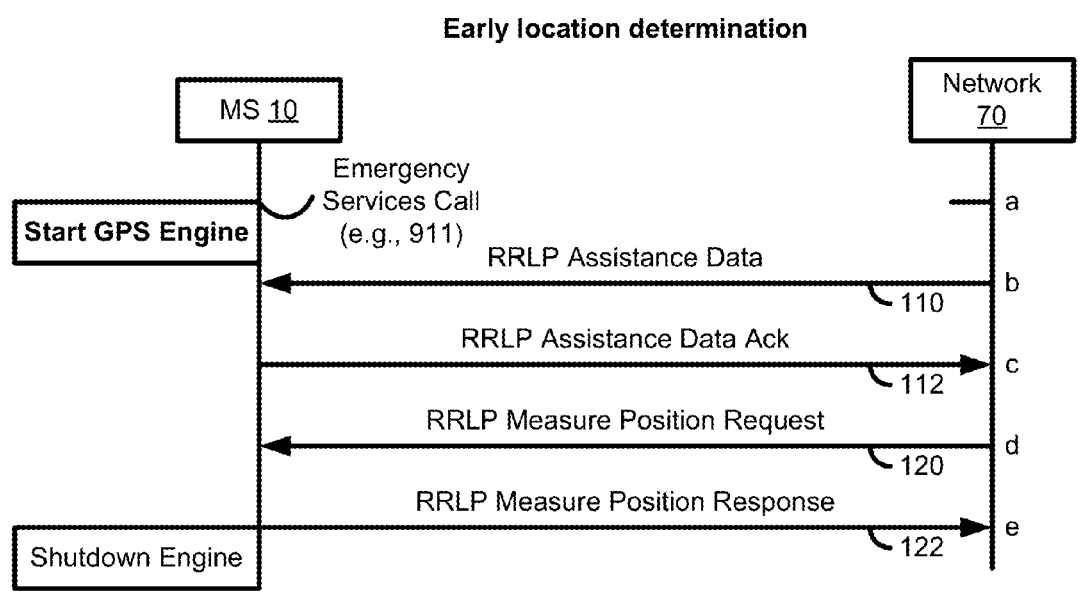
FIG. 8 shows a message flow diagram highlighting early location determination, in accordance with embodiments of the present invention.

FIG. 8 shows a message flow diagram highlighting early location determination, in accordance with embodiments of the present invention. One goal is to start the GPS engine as soon as the MS 10 expects or anticipates a future RRLP Measure Position Request message 120 from a network 70. At time a, the MS 10 recognizes dialed digits for an emergency services call (e.g., "911" in the U.S., "112" in Europe or "119" in Japan). Once the call is recognized as an emergency services call, the MS 10 may begin position location by starting its GSP engine in expectation of a need for a location fix of the MS 10.

At time b, the network 70 sends an RRLP Assistance Data message 110 to the MS 10. In response, at time c, the MS 10 replies with an RRLP Assistance Data Ack message 112. This process of sending messages 110 and 112 may repeat until the network 70 has transmitted sufficient Assistance Data. Finally, at time d, the network 70 sends an RRLP Measure Position Request message 120 to the MS 10. The MS 10 continues determining its location. Next at time e, the MS 10 replies to the network 70 with an RRLP Measure Position Response message 122 containing its determined position.

Figure 9:
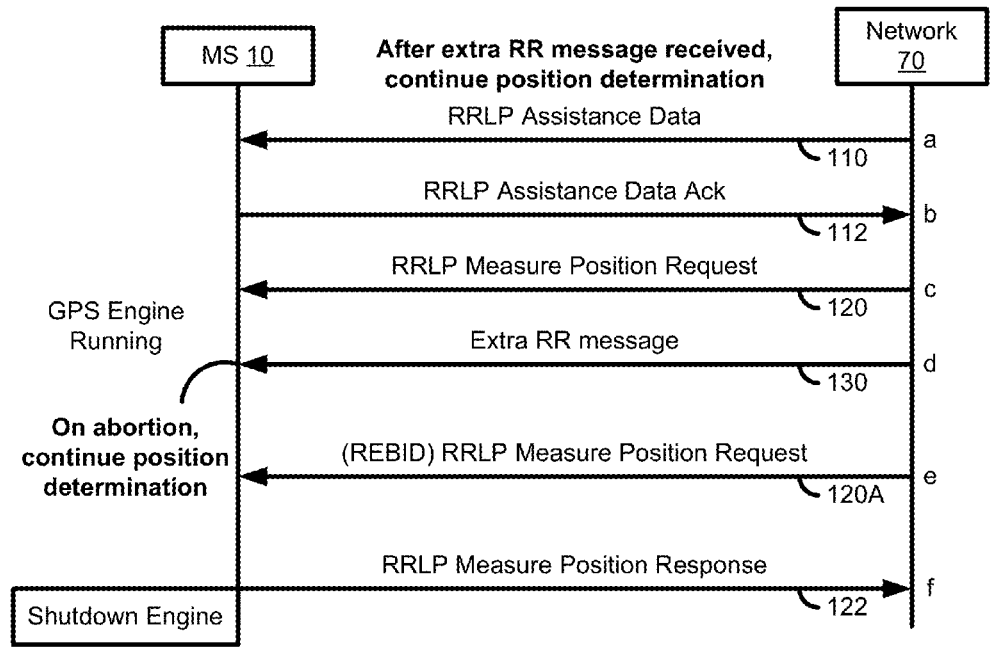
FIGS. 9 and 10 illustrate a method of continuing position determination after an extra RR message is received, in accordance with embodiments of the present invention.
Figure 10:
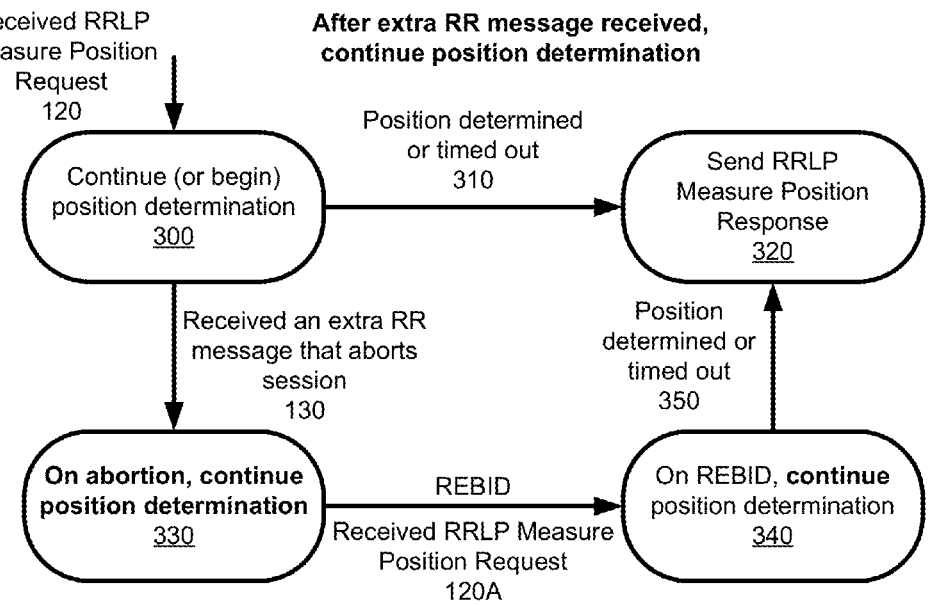

FIGS. 9 and 10 illustrate a method of continuing position determination after an extra RR message 130 is received, in accordance with embodiments of the present invention. Another goal is to continue operating the GPS engine through minor abnormal events. In FIG. 9, an extra RR message 130 aborts a current measurement session but the MS 10 continues position location processing and does not interrupt its GPS engine. At time a, the MS 10 receives an RRLP Assistance Data message 110 from the network 70. In response at time b, the MS 10 replies with an RRLP Assistance Data Ack message 112. Again, this process of sending messages 110 and 112 may repeat until the network 70 has transmitted sufficient Assistance Data.

At time c, the network 70 sends an RRLP Measure Position Request message 120 to the MS 10. At this point the GPS engine is already running; either based on the MS 10 recognizing an emergency call or other triggering event. At time d, before the network 70 receives a reply, the network 70 interrupts the RRLP session begun at time c. Known mobile stations terminate the RRLP session and also shutdown the GPS engine. Here, the MS 10 leaves the GPS engine uninterrupted to allow it to continue the position location process.

Finally at time e, the network 70 re-sends an RRLP Measure Position Request message 120A to the MS 10 in a rebid process. Again, the MS 10 does not restart the GPS engine but rather continues the location process. As stated above, processes of aborting and rebidding may repeat. Next, at time f, the MS 10 replies to the network 70 with an RRLP Measure Position Response message 122 containing its determined position.

FIG. 10 shows a state diagram. The MS 10 enters state 300 when a triggering event occurs. Triggering events include receiving an RRLP Measure Position Request message 120, receiving an RRLP Assistance Data message 110, recognizing initiation of an emergency services call and the like. In state 300, the MS 10 continues position determination if already running or begins position determination by starting the GPS engine if not already started.

Normally, the MS 10 exits state 300 either when position is determined or when a time out occurs (shown as transition 310) and enters state 320. The time out, for example, may occur when the MS 10 determines that the network 70 is expecting a measurement within a small predetermined amount of time. In some cases, the MS 10 exits state 300 and enters state 330 when the MS 10 receives an extra RR message 130, which aborts the current RRLP session before the MS 10 can send its response.

In state 330, the MS 10 aborts the current RRLP session but continues position determination. Upon receipt of a rebid RRLP Measure Position Request message 120A, the MS 10 enters state 340 but again continues the position determination process. Once the MS 10 determines the position or a time out occurs (shown as transition 340), the MS 10 exits state 340 and enters state 320. In state 320, the MS 10 sends its RRLP Measure Position Response message 320 to the network 70.

Figure 11:
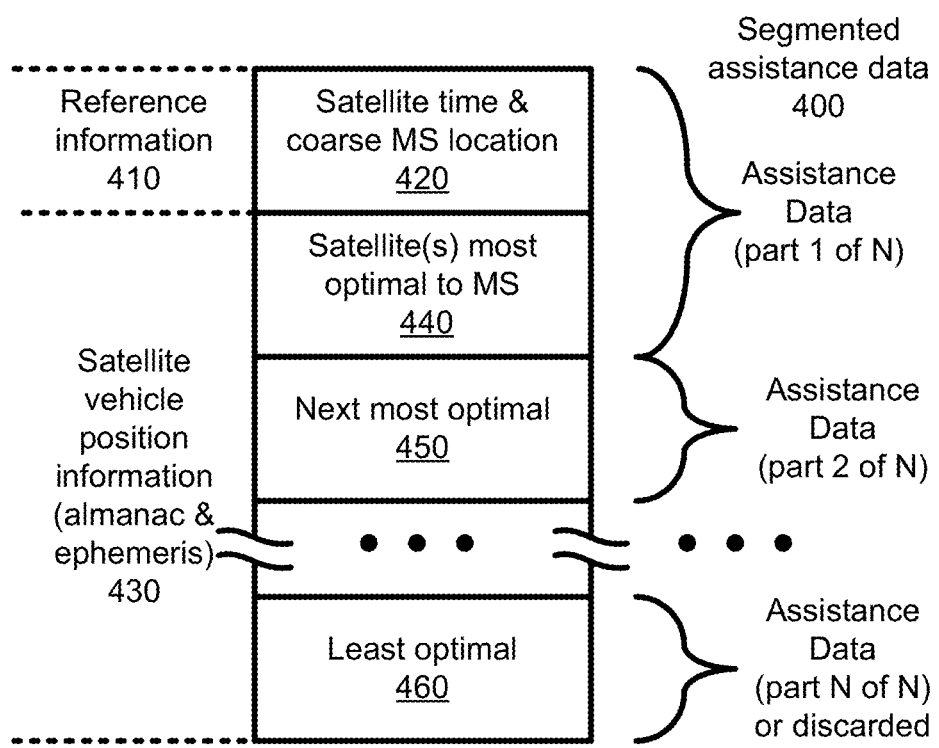
FIGS. 11 and 12 illustrate a method of optimally ordering downloaded Assistance Data, in accordance with embodiments of the present invention.
Figure 12:
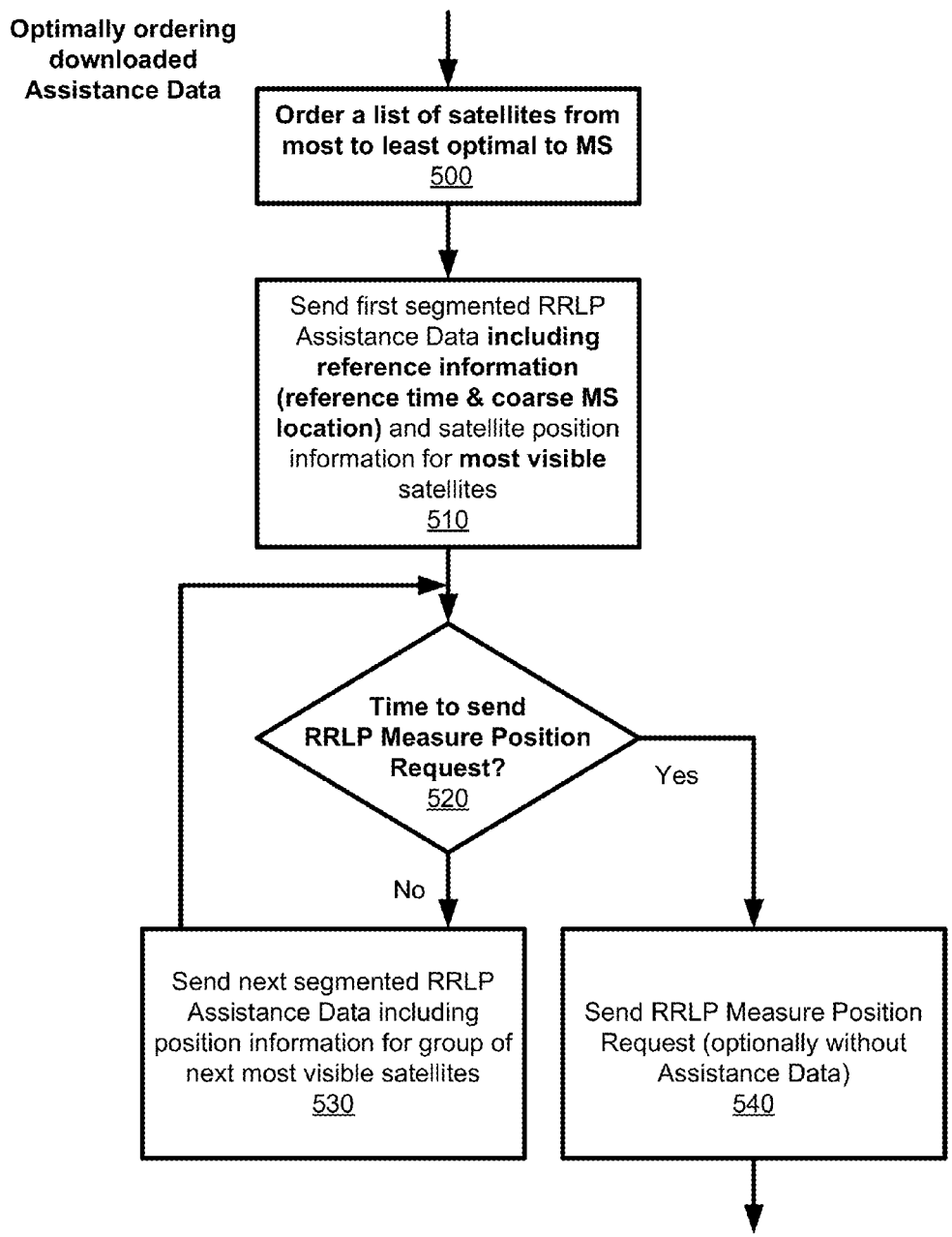

FIGS. 11 and 12 illustrate a method of optimally ordering downloaded Assistance Data, in accordance with embodiments of the present invention. Assistance Data may be transmitted in one or more (pseudo segmented) RRLP Assistance Data messages 110 and/or in an RRLP Measure Position Request message 120. Optimally ordering the communication of Assistance Data from the network 70 to the MS 10 allows the MS 10 to advantageously begin the position determination process early and actively use segments of the Assistance Data before instructed to do so by the RRLP Measure Position Request message 120.

FIG. 11 shows an optimal ordering of segmented Assistance Data 400. The first segment includes reference information 410 including a satellite time and a coarse MS location 420. The first and remaining segments include satellite vehicle position information (including almanac and ephemeris data) 430. The satellite vehicle position information 430 is ordered from most optimal 440, to next most optimal 450, and continues to least optimal 460. Not all satellites available need be placed in this optimally ordered Assistance Data list.

Optimal ordering of the satellites may take into account one or more factors to provide the MS 10 with a set of satellite most likely to be viewable and helpful to the MS 10 in quickly determine its location. For example, knowledge of coarse MS location may be used to lookup satellite positions shown empirically to be visible to mobile stations with similar coarse MS locations. The network 70 may look for satellites to be in a region of space shown by observation or experimentation to be available to a mobile station having a similar or the same coarse MS location.

Furthermore, knowledge of the coarse MS location may be used to determine a general characteristic of the environment. This environmental characteristic may used to identify the best satellites to allow the MS 10 to determine its location. The coarse MS location may identify the MS 10 as being situated, for example, in a rural landscape (e.g., in a flat rural environment), in a mountainous landscape (e.g., in a north-south oriented valley or along the west face of a mountain), or in an urban landscape (e.g., in a dense downtown with high-rise buildings). If the coarse MS location indicates the MS 10 most likely has an unobstructed view of the sky, a network 70 may first provide satellite position information for an orthonormal or pseudo-orthonormal set of satellites, for example, three satellites closest to 45 degrees from the horizon separated by 120 degrees from one another. Any two of these three satellites would be approximately orthogonally oriented with respect to the mobile station. That is, a first line between the first satellite to the mobile station and a second line between the second satellite to the mobile station form a right angle (orthonormal) or an angle between 60 and 120 degrees (approximately orthogonally oriented). If the coarse MS location suggests that the MS 10 would not be able to see satellites located in a particular region of space (e.g., if a mountain blocks the eastern sky), then position information for those satellites may be lower in the optimal list of satellites (or even removed from the list entirely).

In addition to the reference information 410, the first segment of Assistance Data may also include information on one or two satellites, as provided by the allowable message length. The first segment includes satellite position information that is the most optimal 440 to the MS 10. The second segment of Assistance Data includes satellite position information for the next two, three or four most optimal satellites 450. Each subsequent segment of Assistance Data includes satellite position information for equal or less and less optimal satellites until the set of least optimal 460 satellites is reached.

FIG. 12 shows a flow chart for ordering and sending segments of Assistance Data. At step 500, the network 70 orders a list of satellites from most to least optimal to the MS 10 to produce an ordered list, both lists which may also be stored in memory within the network 70. The order may be specific for each MS 10. For example, the order may depend on the coarse MS location. At step 510, the network 70 sends the first segmented RRLP Assistance Data message 110 including the reference information (i.e., reference time & coarse MS location) and satellite position information for most optimal satellites.

At step 520, the network 70, for example using a controller or controller logic within the network 70, determines if it is time to send an RRLP Measure Position Request message 120. The network 70 may determine that it is time to send an RRLP Measure Position Request message 120 if sufficient Assistance Data has already been sent to the MS 10. If the MS 10 has satellite position information for at least a predetermined number of satellites (e.g., 4-14 satellites), then the network 70 may determine that the MS 10 has a sufficient amount of Assistance Data. Alternatively, if the predetermined number of satellites is not reached but no more satellite information is available to send in an Assistance Data message, the network may either transmit the RRLP Measure Position Request message (with or without a final piece of Assistance Data) or may set a timer such that the RRLP Measure Position Request message is sent to receive an RRLP Measure Position Response message just in time. Alternatively, the network 70 may determine that the MS 10 has a sufficient amount of Assistance Data if the time remaining before the position fix is needed by the network 70 is less than a predetermine amount of time. In this case, the network 70 will determine that it is time to send the RRLP Measure Position Request message 120 if a time out has occurred. Alternatively, the network 70 may determine that it is time to send the RRLP Measure Position Request message 120 if all Assistance Data have previously been sent.

If it is not time to send the RRLP Measure Position Request message 120, the network 70 may proceed to step 530. If it is time to send the RRLP Measure Position Request message 120, the network 70 may proceed to step 540. At step 530, the network 70 send the next segmented RRLP Assistance Data message 110 including position information for the group of next most optimal satellites then returns to step 520. This loop between steps 520 and 530 may continue multiple times. At step 540, the network 70 sends an RRLP Measure Position Request message 120. The RRLP Measure Position Request message 120 may contain a final segment of Assistance Data. Alternatively, the RRLP Measure Position Request message 120 may be void of any Assistance Data as described in detail below.

Figure 13:
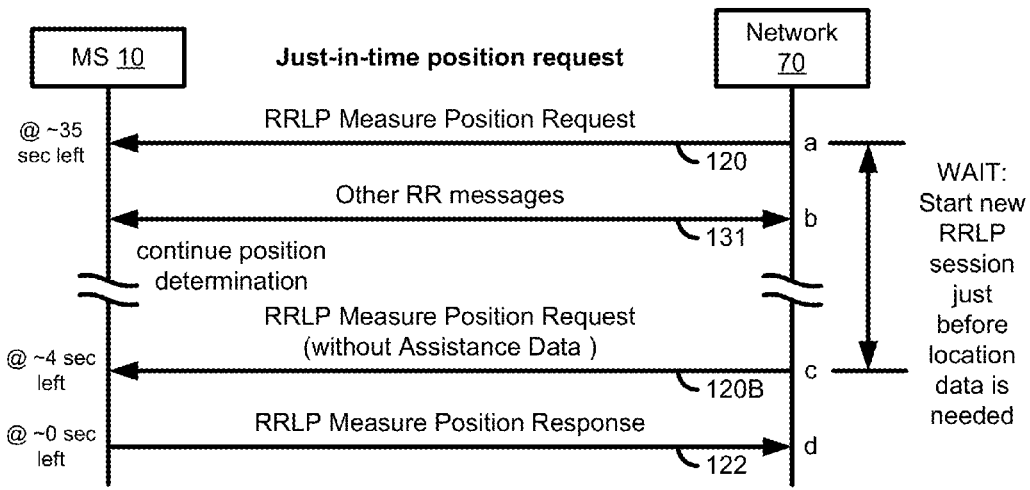
FIGS. 13 and 14 show a method of sending just-in-time position requests, in accordance with embodiments of the present invention.
Figure 14:
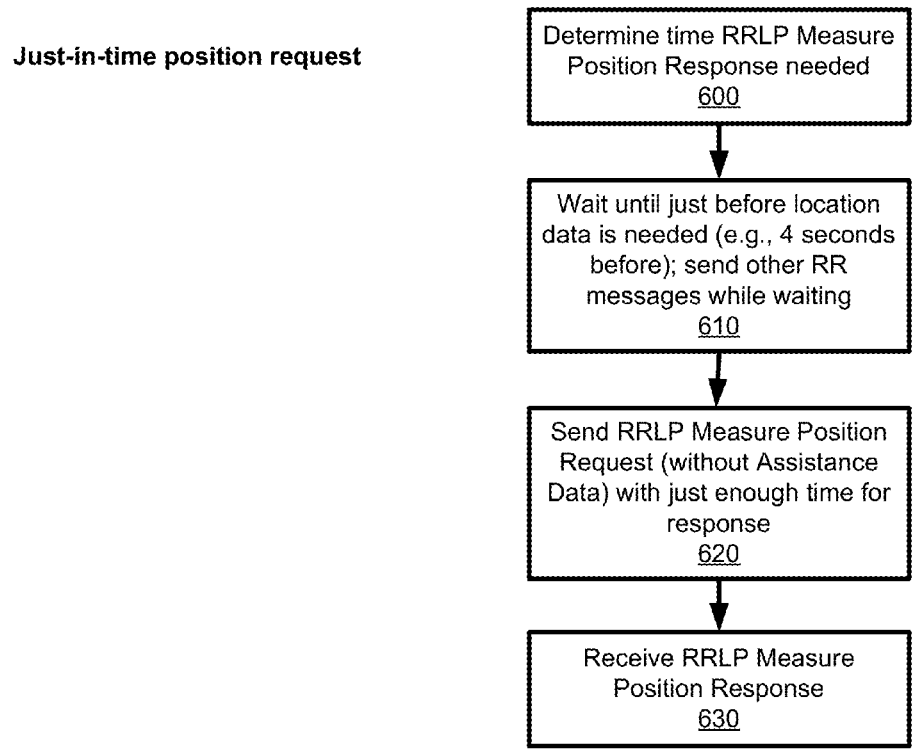

FIGS. 13 and 14 show a method of sending just-in-time position requests, in accordance with embodiments of the present invention.

In FIG. 13, at time a, the network 70 begins an RRLP session by sending an RRLP message such as an RRLP Measure Position Request message 120. This scenario assumes the network 70 successfully sent one or more an RRLP Assistance Data messages 110 to the MS 10 or that the MS 10 already has Assistance Data in its memory. In the example shown, the network 70 requires a position fix from the MS 10 in approximately 35 seconds. At time b, the RRLP session is aborted due to some other RR message 131.

In some cases, the RRLP message 120 shown at time a may still be in an outgoing queue of the network 70, thus the MS 10 has not received an RRLP message and has not started an RRLP session. In this case, the other RR message 131 preempts the RRLP message 120 by removing it from the queue before it can successfully and completely be transmitted out of the queue. Due to the MS 10 previously receiving a triggering event, such as a first RRLP Assistance Data message (not shown), the GPS engine is already running During each subsequent message, the GPS engine continues to the position determination process uninterrupted.

The network 70 at time c determines that only a minimum about of time remains until a position fix is needed (e.g., approximately 4 seconds remain). The network 70 sends an RRLP Measure Position Request message 120B to the MS 10. This message 120B is sent at a time (time c) such that a response will be received just in time (at time d). In some embodiments, the RRLP Measure Position Request message 120B is sent with NW Response Time and NW Accuracy parameters but without Assistance Data. The RRLP Measure Position Request message 120 may include a short timeout (e.g., NW Response Time represents 2 or 4 seconds) for which the MS 10 must return a position fix and may contain a low value for uncertainty (NW Accuracy indicates a high accuracy, for example, approximately 10 meters). Alternatively, the RRLP Measure Position Request message 120 may include a position accuracy parameter set to allow a large position uncertainty (NW Accuracy indicates a low accuracy, for example, approximately 250 meters). At time d, the network 70 receives an RRLP Measure Position Response message 122 from the MS 10 just in time when approximately 0 seconds or close to 0 seconds remain.

This just-in-time procedure may be invoked because a rebid was necessary due to an earlier interrupted RRLP session. In some cases the interrupted RRLP session must be a session started by an earlier RRLP Measure Position Request message 120 (as shown). In some cases the interrupted RRLP session must be a session started by an RRLP Assistance Data message 110. In some cases the interrupted RRLP session may be a session started by either an earlier RRLP Measure Position Request message 120 or an RRLP Assistance Data message 110.

FIG. 14 shows a process in a network 70 for just-in-time position requests and responses. At step 600, the network 70 determines a future time that an RRLP Measure Position Response message 122 is needed. At step 610, the network 70 sets a timer, a schedule or the like and waits until just before location data is needed (e.g., 4 seconds before). During this waiting time after the last RRLP message and before the just-in-time RRLP Measure Position Request message 120, the network may send other RR messages and not interrupt the mobile station's position determination process.

At step 620, the network 70 sends an RRLP Measure Position Request message 120. This message 120 is sent without Assistance Data at a time giving the MS 10 sufficient time to respond. At step 630, the network 70 receives an RRLP Measure Position Response message 122 just before the position is needed.

As mentioned above, this just-in-time process may be implemented for all RRLP Measure Position Request messages 120 being transmitted by the Network 70. Waiting to send an RRLP Measure Position Request message 120 until just before a position fix is needed (e.g., if experiencing rebids) helps to reduce occurrences of aborted sessions and spares channel bandwidth. Alternatively, this process may be implemented if one or more abortions and/or preemptions have occurred within the present communication with this MS 10. Alternatively, this process may be implemented if one or more abortions or preemptions have occurred in communications with other mobile stations in this cell, for example, for mobile stations having similar coarse MS locations.

Figure 15:
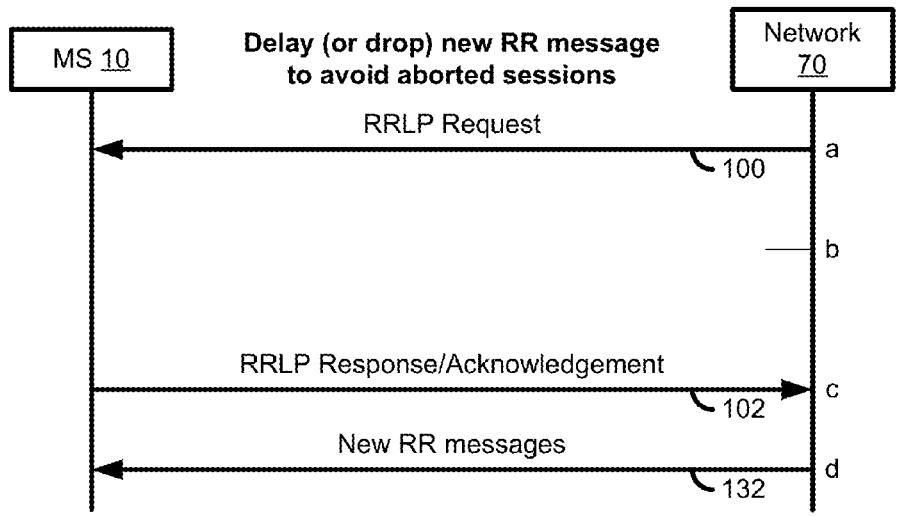
FIGS. 15 and 16 show a method of delaying (or dropping) new RR messages to avoid aborted sessions, in accordance with embodiments of the present invention.
Figure 16:
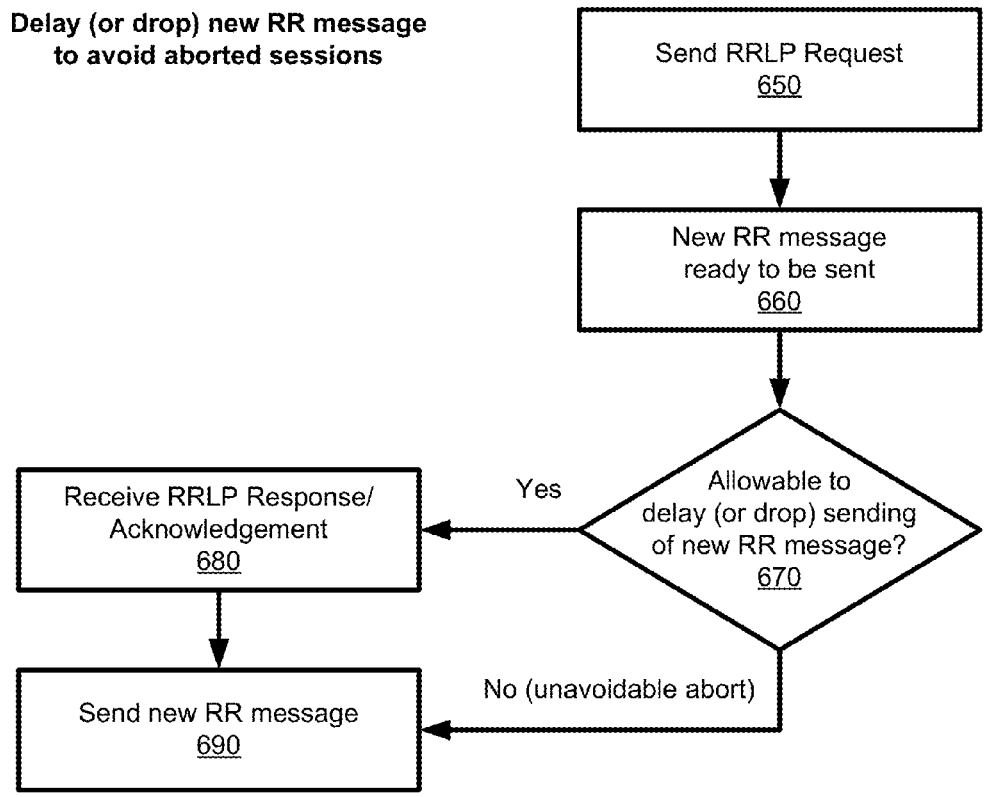

FIGS. 15 and 16 show a method of delaying (or dropping) new RR messages to avoid aborted sessions, in accordance with embodiments of the present invention.

FIG. 15 shows a method of minimizing rebids between a network 70 and a MS 10 in a wireless network. At time a, the network 10 sends an RRLP Request message 100 thereby opening a session. The RRLP Request message 100 may be either an RRLP Assistance Data message 110 or an RRLP Measure Position Request message 120. At time b, before the network 10 has received a response from the MS 10, the network 70 determines, while the RRLP session is still open, a new RR message is ready to be sent from the network 70 to the MS 10. In known systems, the network 70 immediately sends this new RR message thereby aborting the current RRLP session. According to embodiments of the present invention, the network 70 waits, if allowable, to send new RR messages to avoid a current RRLP session from being aborted. That is, to avoid aborting the RRLP session, the network 70 holds the new RR message until after an RRLP Response/Acknowledgement message 102 is received thereby causing the RRLP session to close normally. Based on the particular new RR message, the network 70 may either wait to send the new RR message or drop the new RR message entirely. At time c, the network 70 receives and recognizes the RRLP Response/Acknowledgement message 102. Shortly after, at time d, if the new RR message was not dropped, the network 70 sends the new RR message after the RRLP session is closed, thus avoiding aborting the RRLP session.

In FIG. 16 at step 650, the network 70 sends an RRLP request message. At step 660, before the RRLP session is closed, the network 70 determines it has a new RR message ready to be sent to the MS 10. At step 670, the network 70 determines whether it is allowable to delay (or drop) the sending of the new RR message. If it is not allowable, the network 70 sends the new RR message at step 690, thus unavoidably aborting the current RRLP session. At step 680, the network 70 waits for and then receives the RRLP Response/Acknowledgement message 102. If the new RR message was delayed, processing continues to step 690 before completing processing. If the new RR message was dropped, there is no new RR message remaining to be sent and processing is complete.

FIGS. 17, 18, 19, 20 and 21 illustrate a method of varying an accuracy parameter to balance response time and accuracy in an emergency services (ES) call, in accordance with embodiments of the present invention.

Figure 17:
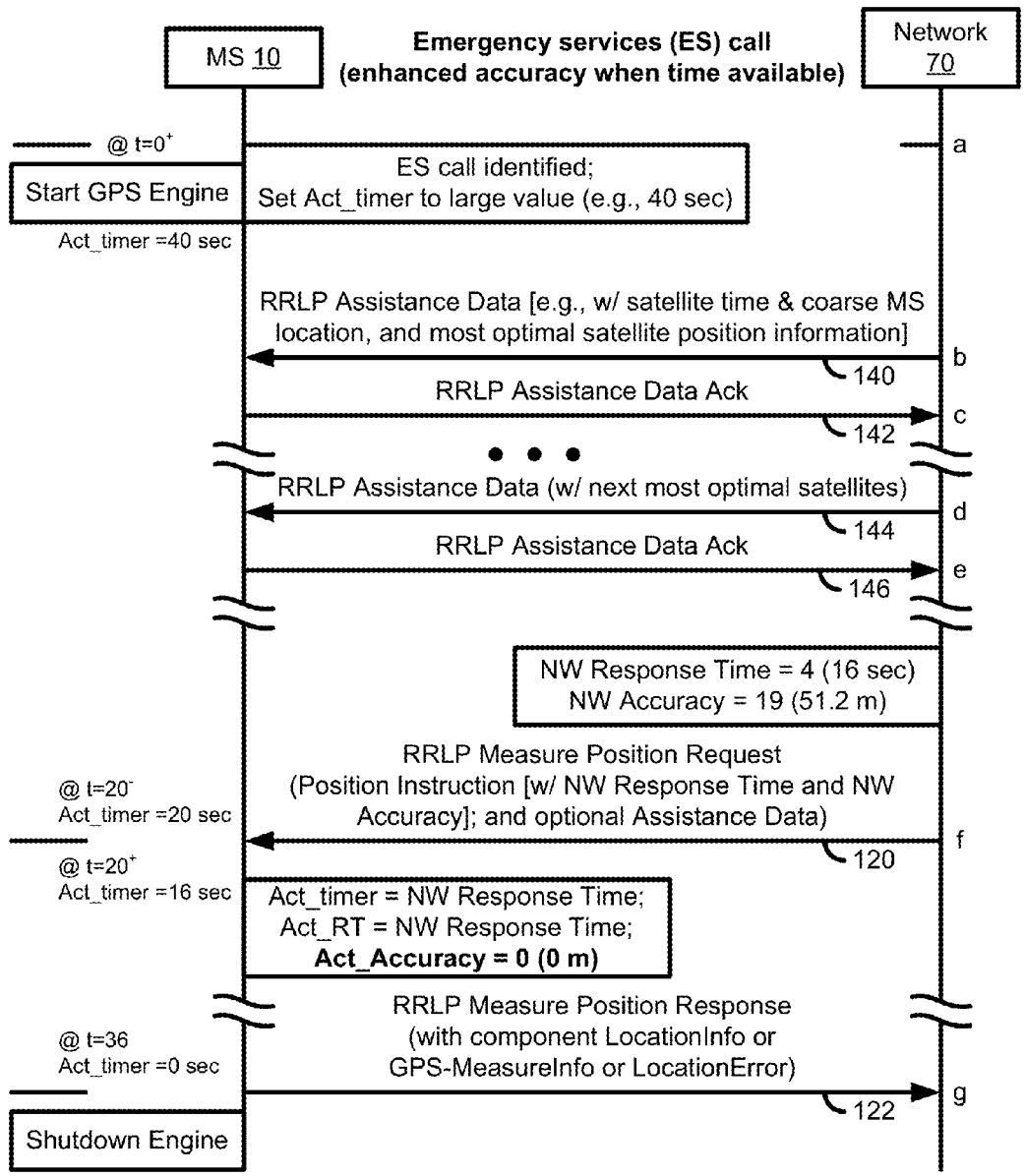
FIGS. 17, 18, 19, 20 and 21 illustrate a method of varying an accuracy parameter to balance response time and accuracy in an emergency services (ES) call, in accordance with embodiments of the present invention.

FIG. 17 shows an example of call flow processing for an emergency services (ES) call to use enhanced accuracy when time is available. At time a (t=0), the MS 10 identifies an ES call. In response to identifying the ES call, the MS 10 starts the GPS engine. The MS 10 may set an activity timer to a large value (e.g., Act_timer=40 seconds). One purpose for an activity time is to monitor the activity (or inactivity) of messages between the network 70 and the MS 10. If there is no activity for the duration of time, the activity timer will timeout and the GPS engine will be shutdown.

At time b, the network 70 sends a first RRLP Assistance Data message 140. This first message 140 contains the reference information 410 (satellite time and coarse MS location 420 from FIG. 11). It also contains satellite position information for the satellites most optimal to the MS 10. At time c, the MS 10 replies with an RRLP Assistance Data Ack message 142. At time d and time e, the process of communicating Assistance Data messages 144 and acknowledgement messages 146 may repeat one or more times to send additional Assistance Data (satellite position information) for the satellites next most optimal to the MS 10.

Next the network 70 prepares an RRLP Measure Position Request message 120. The RRLP Measure Position Request message 120 may contain a value for a network response time (NW Response Time) parameter. This NW Response Time parameter may be set to indicate an intermediate response time (e.g., a value of 4 corresponds to 16 seconds). The message 120 may also contain a network accuracy (NW Accuracy) parameter. This NW Accuracy parameter may be set to indicate an intermediate accuracy or uncertainty (e.g., a value of 19 corresponds to 51.2 meters). This parameter and other distance or uncertainty parameters or ranges described herein with specific values are provided as examples only. Other values may be used. A value of 51.2 meters or 245.5 meters, for example, may be values ranging from 40 to 60 meters, 30 to 70 meters, 40 to 100 meters, 40 to 400 meters, 100 to 150 meters, 100 to 250 meters, 100 to 300 meters, 100 to 400 meters and the like as a person skilled in the art understands.

At time f, the network 70 sends the RRLP Measure Position Request message 120. In some cases, a last set of Assistance Data is included in this message 120. In other cases, the last set of Assistance Data is included in the previous message, which was the RRLP Assistance Data message 144.

To enhance the accuracy, the MS 10 may use an accuracy value that represents no or little uncertainty. For example, an Act_Accuracy parameter may be set to a value of 0, which represents 0 meters of uncertainty (the highest value of accuracy). Alternatively, the Act_Accuracy parameter may be set to a value of 1, 2, 3 or 4 to represent an uncertainty of 1.0, 2.1, 3.3 or 4.6 meters, respectively. Other values representing no or little uncertainty may also be used.

In some cases, where the MS 10 drives this enhanced accuracy process, the MS 10 advantageously sets the Act_Accuracy parameter independently from the NW Accuracy parameter sent by the network 70. In other cases, where the network 70 drives the enhanced accuracy process, the network 70 advantageously and temporarily overrides its standard network accuracy (e.g., 51.2 m) and sets the parameter it will later send in an RRLP Measure Position Request message 120 to the accuracy value that represents no or little uncertainty.

Also shown, after time f, the MS 10 resets it activity timer from the current countdown time (e.g., 20 seconds) to a value that matches the network response time (Act_timer=NW Response Time), for example, if the remaining time on the current activity timer is less than the network provided response time. In this way, the MS 10 will not prematurely shutdown the GPS engine before a position measurement fix is determined and communicated to the network 70. The MS 10 may similarly set a second countdown timer to the response time (Act_timer=NW Response Time). This timer may be used by the MS 10 to set when the MS 10 sends a determined position.

At time g, the elapse time in the example is 36 seconds. The MS 10 has used the entire allocated network response time in determining a position fix. Thus, even though the position accuracy has not been achieved, an enhanced accuracy position has been found potentially having greater accuracy (or similarly, less uncertainty) than requested by the standard network accuracy (e.g., 51.2 m).

By lowering this uncertainty parameter to 0, the MS 10 will use the entire allowable network response time in computing a position fix. By lowering the uncertainty parameter to a low value (e.g., 1, 2, 3, or 4), the MS 10 will most likely use the entire allowable network response time unless a position fix may be determined with a low estimated uncertainty. The additional time used by the GPS engine in trying to obtain a position fix with the lowered requisite uncertainty allows the MS 10 an opportunity to produce an enhanced accuracy position fix.

At time g, the MS 10 sends an RRLP Measure Position Response message 122 with one of the following components: LocationInfo; GSP-MeasureInfo; or LoctionError. Typically, the MS 10 will respond with the LocationInfo component when the MS 10 determines an acceptable position fix or times out. Alternatively, the MS 10 will respond with the GSP-MeasureInfo component when the MS 10 is instructed to provide measurements to the network 70, which allows the network 70 to determine a position based on this raw data.

Figure 18:
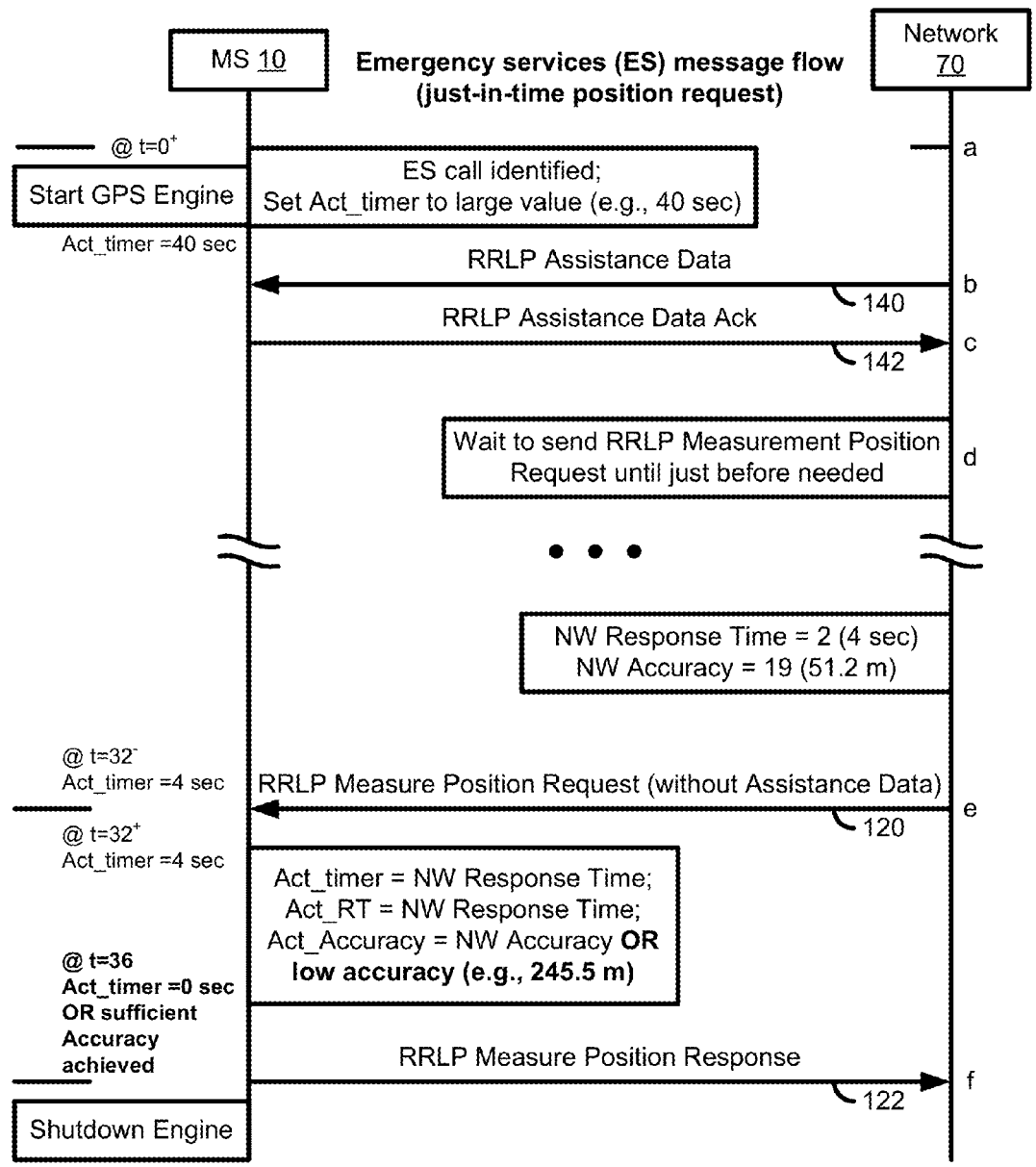

FIG. 18 shows another embodiment of call flow processing for an emergency services (ES) call. In this scenario, a position request messages is communicated just in time for the MS 10 to reply with an on-time position response. The flow begins as described above with reference to FIG. 17. At time a (t=0), the MS 10 identifies the ES call then in response, starts the GPS engine. Again, an activity countdown timer is set (Act_timer=40 seconds). At time b, the network 70 sends a first RRLP Assistance Data message 140. At time c, the MS 10 replies with an RRLP Assistance Data message 142. The process may continue to communication multiple sets of 140/ 142 messages.

At time d, this scenario departs from the previously described scenario. At time d, the network 70 has the information it needs to send a position request message (an RRLP Measure Position Request message 120), however, the network 70 waits to send the message until a predetermined time before the network 70 needs a position fix. A standard network accuracy may be set to provide sufficient accuracy (NW Accuracy=19, representing 51.2 meters), however, the network set response time is drastically shortened. For example, the NW Response Time may be set to 2 (representing 4 seconds) or to 1 (representing 2 seconds) rather than giving the MS 10 10s of seconds. This drastically shortened time normally does not allow a mobile station to determine a position fix. Ordinarily, a mobile station requires tens of seconds to a few minutes. Here, because the MS 10 began its position determination process early (e.g., at time a), it has already been working on it position for tens of seconds.

Again the network 70 prepares an RRLP Measure Position Request message 120. The message 120 contains the drastically shortened network response time (e.g., NW Response Time=4 seconds) and the network accuracy (e.g., NW Accuracy=51.2 meters). At time e, the elapse time in the example is 32 seconds and the network 70 sends the RRLP Measure Position Request message 120. In this case, the last set of Assistance Data is included in the previous message (i.e., the last RRLP Assistance Data message 140), therefore, this messages 120 is sent without Assistance Data.

In some cases, the accuracy used by the MS 10 is set to a value representing low accuracy or equivalently a high uncertainty (e.g., a value of 34 represents 245.5 meters), which may be a predetermined value or a predetermined configurable value. This accuracy value representing low accuracy may be set in one of two ways: by the network 70; or by the MS 10.

If the accuracy value is set by the network 70, the network 70 sends RRLP Measure Position Request message 120 with the network accuracy set to represent this low accuracy value (NW Accuracy). For example, the network 70 may temporarily overwrite the standard network accuracy with the low accuracy value for this MS 10.

On the other hand, if the accuracy is set by the MS 10, the network 70 may send an RRLP Measure Position Request message 120 with the network accuracy set to represent a standard network accuracy. The MS 10 overwrites or ignores the received network accuracy and uses a value representing a low accuracy instead. The MS 10 uses the network response time (NW Response Time) for both its internal countdown timer and its response time timer (i.e., Act_timer=NW Response Time and Act_RT=NW Response Time, respectively). At time f, once the response time timer is zero (elapse time in the example is 36 seconds), the MS 10 prepares and sends an RRLP Measure Position Response message 122.

This scenario has several advantages. Since the MS 10 started the GPS engine early (at time a) and has used a maximum possible duration of time in determining a position fix while minimizing battery power loss, and has produced an enhanced position fix. Since the RRLP Measure Position Request message 120 is short (because it contains no Assistance Data), the likelihood that the message 120 will be preempted is lowered. Since the network response time is low (e.g., 4 seconds), the chance of the final RRLP session being aborted with another RR messages is lowered. If a lowered accuracy value (e.g., Act_Accuracy=245.5 meters) is substituted for the standard network accuracy (e.g., NW Accuracy=51.2 meters), the chance of the final RRLP session being aborted with another RR messages is lowered even further.

Figure 19:
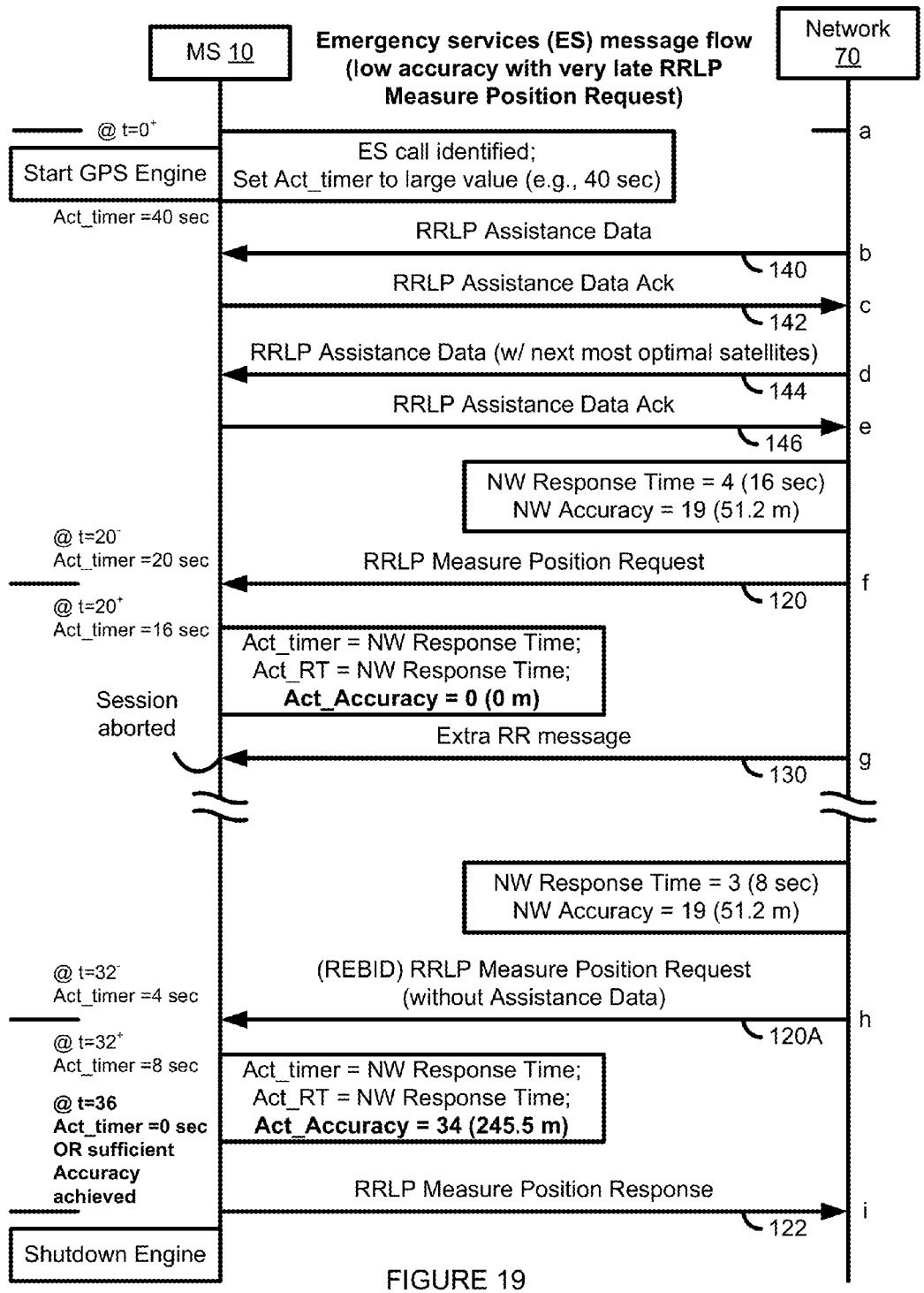

FIG. 19 shows yet another embodiment of call flow processing for an emergency services (ES) call. In this scenario, a first position request message 120 (with or without Assistance Data) is communicated just after the final RRLP Assistance Data message 142. If this RRLP session is interrupted, the network 70 delays sending a rebid position request message 120A (a message without Assistance Data) until a predetermined time based on when the position is needed. Otherwise, the events and message flow from time a to time f are identical to those described above with reference to FIG. 17 and a description will not be repeated.

The sequence diverges from FIG. 17, at time g, where an extra RR message 130 causes the current RRLP session to abort. Equivalently, the RRLP Measure Position Request message 120 may have been preempted internally in the network's outgoing queue (for example, because the RRLP Measure Position Request message 120 is long since it contains Assistance Data). In either case, the MS 10 does not have a currently open RRLP session or an instruction to reply with a position.

The network 70 delays sending a rebid message 120A until a time computed to give the MS 10 just enough time to reply with a position fix such that the position fix is received just in time for the network 70 to report it. Based on an earlier RRLP session being aborted or preempted, the network 70 may determine to switch from a first mode to a second mode. In the first mode, the network 70 sends a rebid based on the prematurely halted RRLP session and sends a rebid position request message immediately as is known. That is, the network 70 bases the timing of the next position request message on a past event, namely completion of the extra RR message and the need to re-send the position request message a quickly as possible.

In this second mode, the network 70 does not send a rebid position request message immediately. Instead, the network 70 advantageously waits for a duration of time based on when the position response is needed. That is, rather than basing timing of the rebid position request message on a past event, the transmission is based on a future event. For example, the timing of the next position request is based on when the position fix is needed (e.g., based on the remaining NW Response Time).

The timing of when the RRLP Measure Position Request message 120 is transmitted may be based on a predetermined time before the time that the position fix is needed in the network 70. In the example shown, a predetermined time is set to 8 seconds (NW Response Time=3) before the position information is needed by the network 70. Other predetermine times may be used, for example, based on empirical data of various mobile stations other predetermined times may be used (e.g., a NW Response Time may be set to 1, 2, 4, 8 or 16 seconds). The network 70 may set a timer or schedule the measurement request message so that the message is transmitted at this future time.

At time h (t=32), the network 70 terminates the delay and transmits the rebid RRPL Measure Position Request message 120A. As indicated, the message contains no Assistance Data. Alternatively, the delay in sending the rebid RRPL Measure Position Request message 120A could be slightly shorted, the response time (NW Response Time) could be slightly increased and the message 120A could contain some Assistance Data. Also, the accuracy parameter used by the MS 10 may be set to a large uncertainty value (e.g., 245.5 meters) either by the MS 10 overwriting the standard network value or by the network 70 as a temporary uncertainty value. The MS 10 resets its activity timer to the network provided response time (Act_timer=NW Response Time).

In this example, the mobile subscriber's activity timer was set to expire in 4 seconds (Act_timer=4 seconds) but this timer is reset based on the received time (change Act_timer=NW Response Time=8 seconds). The MS 10 may set its response time to the network provided response time (Act_RT=NW Response Time=8 seconds). At time i (t=36), the MS 10 reports the determined position with an RRLP Measure Position Response message 122 then shuts down the GPS engine.

Figure 20:
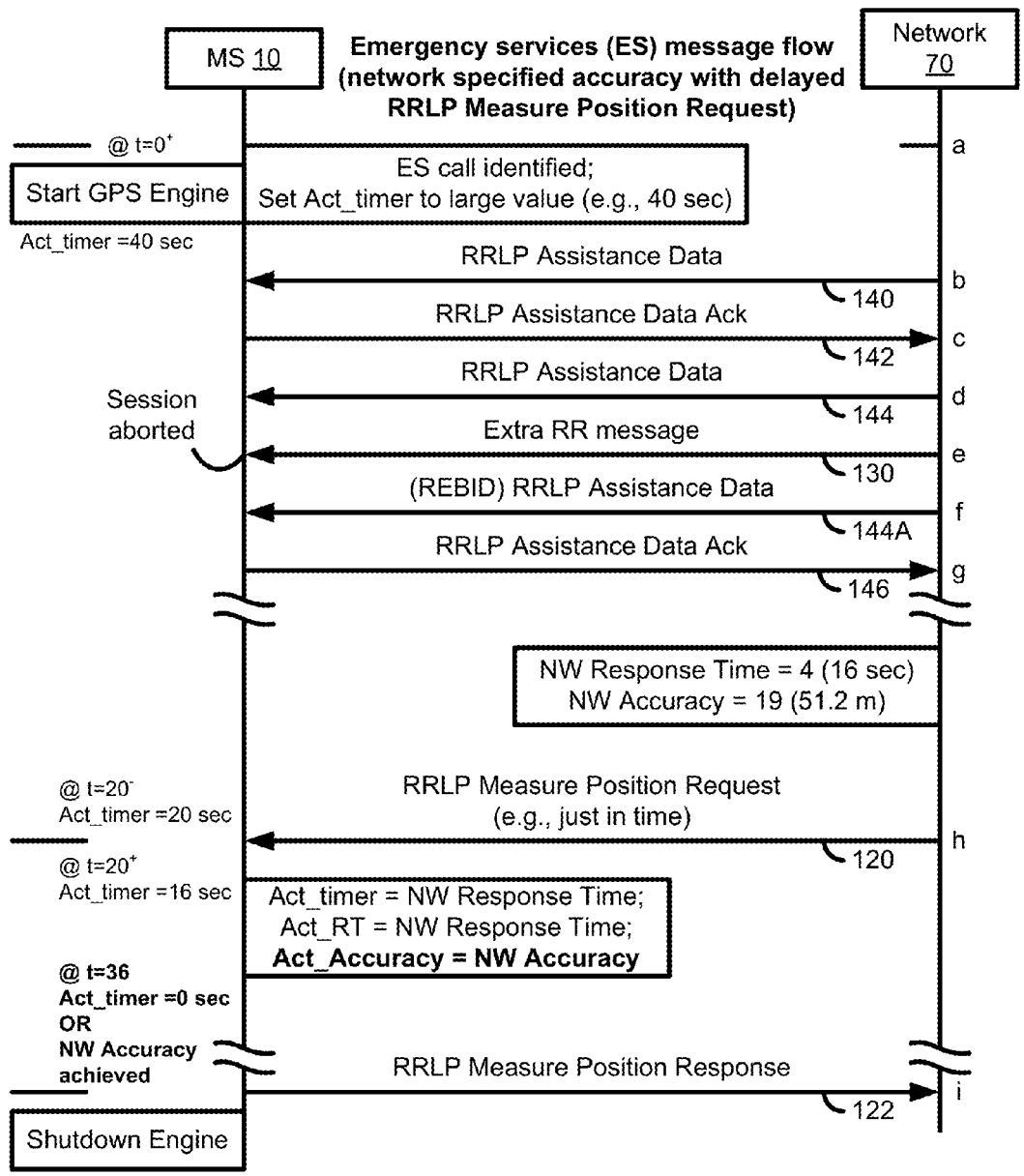

FIG. 20 shows a scenario where the network 70 transmits a just-in-time measurement request message but an earlier rebid of an Assistance Data message causes the MS 10 to use a network provided accuracy. Events and messages at times a through d are identical to those of FIG. 19. At time e, the session is aborted with an extra RR message 144. Similarly, a network could have preempted the transition of messages 144. At times f and g, the Assistance Data is sent as a rebid RRLP Assistance Data message 144A and is acknowledged with an RRLP Assistance Data Ack message 146. The rebid message may be a rebid of the first Assistance Data message (not shown), the second Assistance Data message (as shown) or any other of a segmented sequence of Assistance Data messages (not shown).

At time h (t=20), the network 70 sends an RRLP Measure Position Request message 120 for just in time receipt of a measurement report message as described above. The MS 10 may set its activity timer to the network provided response time (Act_timer=NW Response Time=16 seconds), may set its response timer to the network provided response time (Act_RT=NW Response Time=16 seconds), and may set its accuracy to the network provided accuracy (Act_Accuracy=NW Accuracy=51.2 meters).

In the previous examples, the MS 10 normally uses an accuracy value that is a temporary value. This temporary value is a different value that is either larger or smaller than the standard network accuracy. In this example, the standard network accuracy is used as an exception to using the different value. Finally, at time i (t=36), the MS 10 reports the determined measurement in an RRLP Measure Position Response messages 122.

In some cases, the network 70 may detect the occurrence of a rebid (due to an abortion or a preemption). In this case, the network 70 modifies the network provided accuracy from the temporary value to the standard network accuracy. Alternatively, the MS 10 may detect the occurrence of a rebid Assistance Data message (due to an abortion) and based on this event, the MS modifies its accuracy from the value. Alternatively, the MS may determine that the received measurement request message is delayed base on a measured duration of time from the previous RRLP message.

Figure 21:
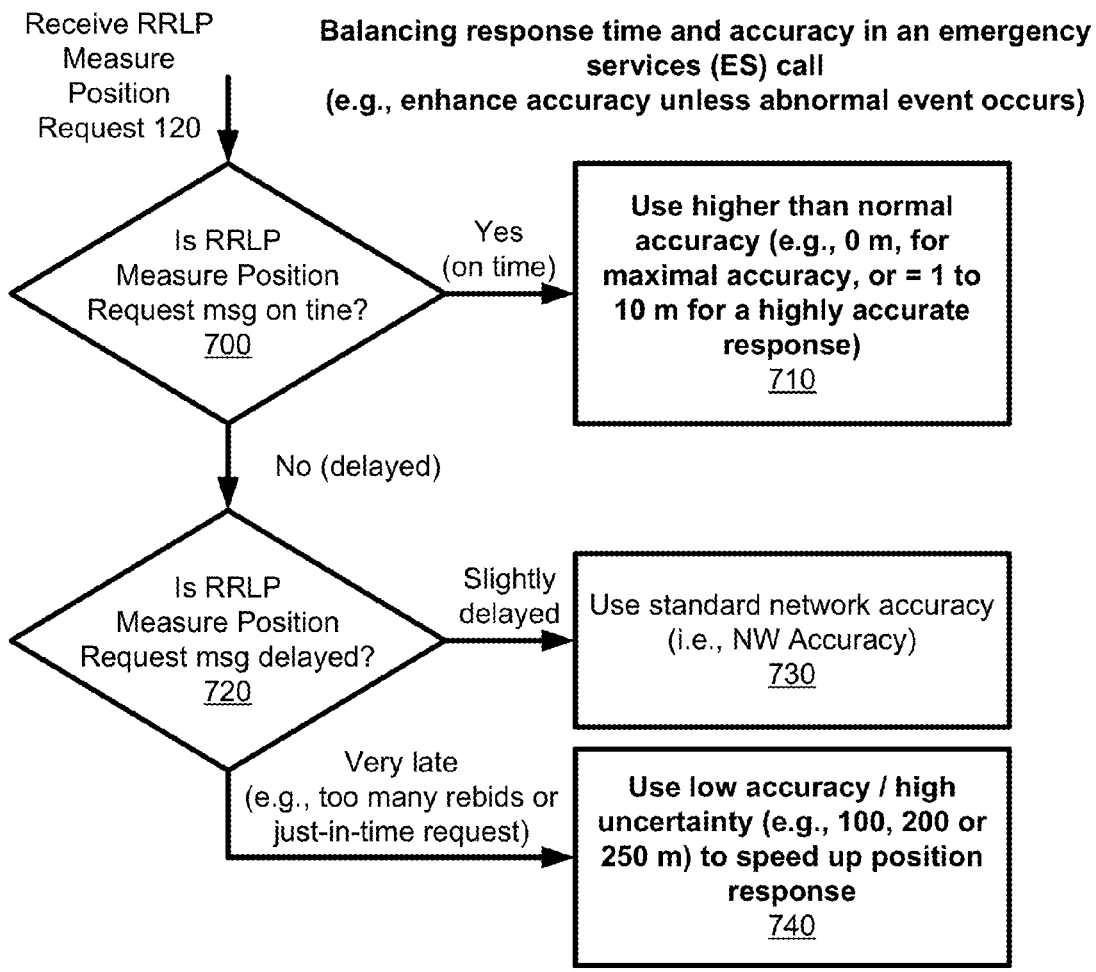

FIG. 21 shows a flow chart relating to modifying an accuracy parameter from the standard network accuracy as described in reference to the previous four figures. At 700, after the MS 10 has received an RRLP Measure Position Request message 120, a determination is made whether the message 120 was sent and received on time. This determination may be done by the MS 10 or by the network 70 based on time (e.g., some expected time of communication), based on abortions or based on preemptions as described above. If the RRLP Measure Position Request message 120 is on time, processing continues at step 710.

At step 710, the MS 10 uses a higher than normal accuracy (e.g., 0 meters) for maximal accuracy or a selected small value less than the standard network accuracy (e.g. a value between 1 and 10 meters or a value between 0 meters and the standard network accuracy value) for a more accurate response.

If the RRLP Measure Position Request message 120 is delayed, the accuracy may be set to the standard network accuracy (not shown). Alternatively, if the RRLP Measure Position Request message 120 is delayed, processing continues at step 720. Another test may be performed at step 720 to determine if the message 120 is slightly delayed or very late. For example, an RRLP Measure Position Request message 120 may be determined to be slightly delayed if a rebid of an Assistance Data message was made. The RRLP Measure Position Request message 120 may be determined to be very late if a rebid of a previous RRLP Measure Position Request message was made. Alternatively, a RRLP Measure Position Request message 120 may be determined to be slightly delayed if it is communicated later than a first predetermined time (e.g., 24 second) but before a second predetermined time (e.g., 36 second). The RRLP Measure Position Request message 120 may be determined to be very late if communicated later than the second predetermined time. At step 730, the MS 10 uses a standard network accuracy (i.e., NW Accuracy). At step 740, the MS 10 uses a lower accuracy value (e.g., 100, 200 or 250 meters) to speed up its position response.

Figure 22:
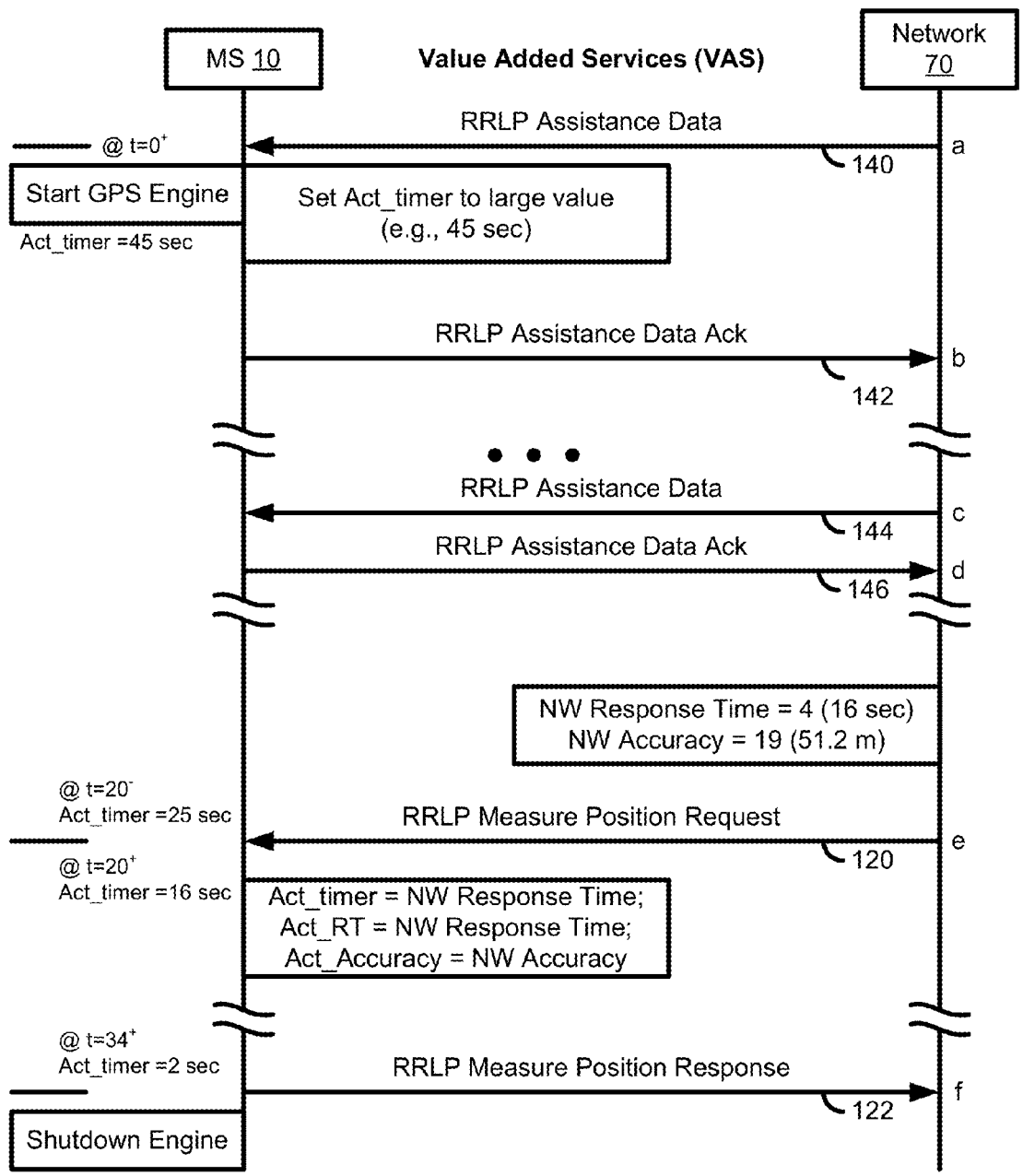
FIG. 22 shows a message flow diagram for a value added service (VAS), in accordance with embodiments of the present invention.

FIG. 22 shows a message flow diagram for a value added service (VAS), in accordance with embodiments of the present invention. For a VAS, the MS 10 does not need to use the full amount of NW Response Time.

At time a (t=0), the network 70 determines a VAS has been initiated. In response, it sends an RRLP Assistance Data message 140. The MS 10 on receipt of the RRLP Assistance Data message 140, starts its GPS engine and sets its activity timer to a predetermined value (a larger value than is used in the case of an ES call, e.g., Act_timer=45 seconds). Also in response to receipt of the RRLP Assistance Data message 140, the MS 10 sends, at time b, an RRLP Assistance Data Ack message 142. At times c and d, additional segments of Assistance Data may be communicated and acknowledged with additional pairs of RRLP Assistance Data messages 144 and RRLP Assistance Data Ack messages 146.

At time e (t=20, Act_timer=25), the network 70 prepares an RRLP Measure Position Request message with a standard network time (e.g., NW Response Time=16 seconds) and a standard network accuracy value (e.g., NW Accuracy=51.2 meters). The network 70 sends and the MS 10 receives the RRLP Measure Position Request message 120. Unlike an ES call, the MS 10 does not discard any network provided parameters. The MS 10 sets its activity timer, active response timer and activity accuracy parameters to network provided values (i.e., Act_timer=NW Response Time, Act_RT=NW Response Time, and Act_Accuracy=NW Accuracy, respectively).

At time f (t=34, Act_timer=2), the MS 10 sends its determined position in an RRLP Measure Position Response message 122 to the network 70. In this case, the MS sent the determined fix before the expiration of the network response time due to position uncertainty being less than the required network accuracy. Finally, in response to reporting the determined fix, the MS 10 shuts down the GPS engine.

It should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A method comprising:
    transmitting by a mobile station an emergency services call;
    receiving by the mobile station one or more Radio Resource Location Services protocol (RRLP) assistance data messages in response to the emergency services call, the one or more RRLP assistance data messages comprising
        a first segment, the first segment including a reference information and a vehicle position information of a first satellite, the reference information including a satellite time of the first satellite and a coarse location estimate for a current position of the mobile station, wherein the satellite time and the coarse location estimate precede the vehicle position information of the first satellite in order of arrival at the mobile station.

2. The method of claim 1, wherein the one or more RRLP assistance data messages comprises
    a second segment, after the first segment, the second segment including the vehicle position information of a second satellite, wherein the first satellite is more likely viewable to the mobile station than the second satellite.

3. The method of claim 2, wherein the vehicle position information of the first satellite comprises almanac and ephemeris data.

4. The method of claim 1, further comprising:
    receiving by the mobile station an RRLP measure position request message; and
    determining position by the mobile station before the RRLP measure position request message is received, based on the one or more RRLP assistance data messages.

5. The method of claim 4, further comprising:
    receiving by the mobile station an extra Radio Resource (RR) message after receiving the RRLP measure position request message;
    receiving by the mobile station a rebid RRLP measure position request message after receiving the extra RR message; and
    running a GPS engine on the mobile station uninterrupted from when the mobile station receives the extra RR message to when the mobile station receives the rebid RRLP measure position request message.

6. A non-transitory computer readable medium having instructions that, when executed by a processor, cause the processor to perform a method comprising:
    transmitting by a mobile station an emergency services call;
    receiving by the mobile station one or more Radio Resource Location Services protocol (RRLP) assistance data messages in response to the emergency services call, the one or more RRLP assistance data messages comprising
        a first segment, the first segment including a reference information and a vehicle position information of a first satellite, the reference information including a satellite time of the first satellite and a coarse location estimate for a current position of the mobile station, wherein the satellite time and the coarse location estimate precede the vehicle position information of the first satellite in order of arrival at the mobile station.

7. The non-transitory computer readable medium of claim 6, wherein the one or more RRLP assistance data messages comprises
    a second segment, after the first segment, the second segment including the vehicle position information of a second satellite, wherein the first satellite is more likely viewable to the mobile station than the second satellite.

8. The non-transitory computer readable medium of claim 7, wherein the vehicle position information of the first satellite comprises almanac and ephemeris data.

9. The non-transitory computer readable medium of claim 6, the method performed by the processor further comprising:
    receiving by the mobile station an RRLP measure position request message; and
    determining position by the mobile station before the RRLP measure position request message is received, based on the one or more RRLP assistance data messages.

10. The non-transitory computer readable medium of claim 9, the method performed by the processor further comprising:
    receiving by the mobile station an extra Radio Resource (RR) message after receiving the RRLP measure position request message;
    receiving by the mobile station a rebid RRLP measure position request message after receiving the extra RR message; and
    running a GPS engine on the mobile station uninterrupted from when the mobile station receives the extra RR message to when the mobile station receives the rebid RRLP measure position request message.

11. A method comprising:
    sending by a network a Radio Resource Location Procedure (RRLP) measure position request message in response to receiving an emergency services call;
    waiting by the network a time interval after sending the RRLP measure position request message before starting another RRLP session by sending the RRLP measure position request message without assistance data, comprising:
        determining by the network a time interval for which an RRLP measure position response is needed, wherein the time interval is equal to the determined time interval for which the RRLP measure position response is needed, less a predetermined time interval; and
    receiving by the network the RRLP measure position response in response to sending the RRLP measure position request message without assistance data.

12. A non-transitory computer readable medium having instructions that, when executed by a processor, cause the processor to perform a method comprising:
    sending by a network a Radio Resource Location Procedure (RRLP) measure position request message in response to receiving an emergency services call;
    waiting by the network a time interval after sending the RRLP measure position request message before starting another RRLP session by sending the RRLP measure position request message without assistance data, comprising:
        determining by the network a time interval for which an RRLP measure position response is needed, wherein the time interval is equal to the determined time interval for which the RRLP measure position response is needed, less a predetermined time interval; and
    receiving by the network the RRLP measure position response in response to sending the RRLP measure position request message without assistance data.

13. A mobile station comprising:
a processor;
a memory coupled to the processor, the memory having instructions that, when executed by the processor, cause the processor to perform a method comprising:
   transmitting by the mobile station an emergency services call;
   receiving by the mobile station one or more Radio Resource Location Services protocol (RRLP) assistance data messages in response to the emergency services call, the one or more RRLP assistance data messages comprising
      a first segment, the first segment including a reference information and a vehicle position information of a first satellite, the reference information including a satellite time of the first satellite and a coarse location estimate for a current position of the mobile station, wherein the satellite time and the coarse location estimate precede the vehicle position information of the first satellite in order of arrival at the mobile station.

14. The mobile station of claim 13, wherein the one or more RRLP assistance data messages comprises
   a second segment, after the first segment, the second segment including the vehicle position information of a second satellite, wherein the first satellite is more likely viewable to the mobile station than the second satellite.

15. The mobile station of claim 14, wherein the vehicle position information of the first satellite comprises almanac and ephemeris data.

16. The mobile station of claim 13, the method performed by the processor further comprising:
   receiving by the mobile station an RRLP measure position request message; and
   determining position by the mobile station before the RRLP measure position request message is received, based on the one or more RRLP assistance data messages.

17. The mobile station of claim 16, the method performed by the processor further comprising:
   receiving by the mobile station an extra Radio Resource (RR) message after receiving the RRLP measure position request message;
   receiving by the mobile station a rebid RRLP measure position request message after receiving the extra RR message; and
   running a GPS engine on the mobile station uninterrupted from when the mobile station receives the extra RR message to when the mobile station receives the rebid RRLP measure position request message.

* * * * *